United States Patent
Nakayama et al.

(10) Patent No.: US 10,031,394 B2
(45) Date of Patent: Jul. 24, 2018

(54) ELECTROPHORETIC PARTICLE, ELECTROPHORETIC PARTICLE DISPERSION LIQUID, DISPLAY MEDIUM, AND DISPLAY DEVICE

(71) Applicant: E INK CORPORATION, Billerica, MA (US)

(72) Inventors: Daisuke Nakayama, Kanagawa (JP); Yasuo Yamamoto, Kanagawa (JP); Naoki Hiji, Kanagawa (JP); Mieko Seki, Kanagawa (JP); Ryota Mizutani, Kanagawa (JP); Chikara Manabe, Kanagawa (JP); Cao Jun, Kanagawa (JP); Toshihide Aoshima, Kanagawa (JP)

(73) Assignee: E Ink Corporation, Billerica, MA (US)

( * ) Notice: Subject to any disclaimer, the term of this patent is extended or adjusted under 35 U.S.C. 154(b) by 609 days.

(21) Appl. No.: 13/719,587

(22) Filed: Dec. 19, 2012

(65) Prior Publication Data

US 2013/0222887 A1 Aug. 29, 2013

(30) Foreign Application Priority Data

Feb. 27, 2012 (JP) .................................. 2012-040630

(51) Int. Cl.
*G02F 1/167* (2006.01)
*C08F 2/44* (2006.01)
*C09B 61/00* (2006.01)
*C09B 62/763* (2006.01)
*C09B 67/46* (2006.01)

(52) U.S. Cl.
CPC ................ *G02F 1/167* (2013.01); *C08F 2/44* (2013.01); *C09B 61/00* (2013.01); *C09B 67/009* (2013.01); *G02F 2001/1678* (2013.01)

(58) Field of Classification Search
USPC ........................................................... 252/581
See application file for complete search history.

(56) References Cited

U.S. PATENT DOCUMENTS

| 4,680,103 | A  | * | 7/1987 | Beilin ..................... G02F 1/167 359/296 |
| 8,654,070 | B2 |   | 2/2014 | Tokunaga et al. |
| 9,403,987 | B2 | * | 8/2016 | Hayoz .................. C09B 69/008 |
| 2005/0179983 | A1 | * | 8/2005 | Sakai ..................... G02F 1/167 359/296 |

(Continued)

FOREIGN PATENT DOCUMENTS

| JP | 2004138930 A | 5/2004 |
| JP | 2005-227729 A | 8/2005 |

(Continued)

OTHER PUBLICATIONS

Office Action dated Sep. 15, 2015, issued by the Taiwanese Patent Office in Taiwanese Application No. 102101602.

*Primary Examiner* — Ling Siu Choi
*Assistant Examiner* — Thuy-Ai N Nguyen
(74) *Attorney, Agent, or Firm* — Brian D. Bean

(57) ABSTRACT

There is provided an electrophoretic particle which contains a core material particle formed of a composition containing a resin, a nitrogen-containing heterocyclic compound having any one of an imino group, a methylol group and an alkoxymethyl group in the molecule and a heterocyclic ring having a nitrogen atom, and a coloring agent.

18 Claims, 3 Drawing Sheets

(56) References Cited

U.S. PATENT DOCUMENTS

| | | | |
|---|---|---|---|
| 2006/0132895 A1* | 6/2006 | Miyazaki | G02B 26/026 359/296 |
| 2008/0241485 A1* | 10/2008 | Shimohara | C09D 11/101 428/195.1 |
| 2008/0291526 A1* | 11/2008 | Lin | G02F 1/167 359/296 |
| 2010/0020385 A1* | 1/2010 | Yamamoto et al. | 359/296 |
| 2010/0289736 A1 | 11/2010 | Feick et al. | |
| 2011/0306742 A1 | 12/2011 | Farrand et al. | |
| 2011/0310462 A1 | 12/2011 | Farrand et al. | |
| 2014/0211296 A1 | 7/2014 | Walls et al. | |

FOREIGN PATENT DOCUMENTS

| | | |
|---|---|---|
| JP | 2006-106596 A | 4/2006 |
| JP | 2006113438 A | 4/2006 |
| JP | 2009-223080 A | 10/2009 |
| TW | 201037018 A1 | 10/2010 |
| TW | 201107430 A1 | 3/2011 |

* cited by examiner

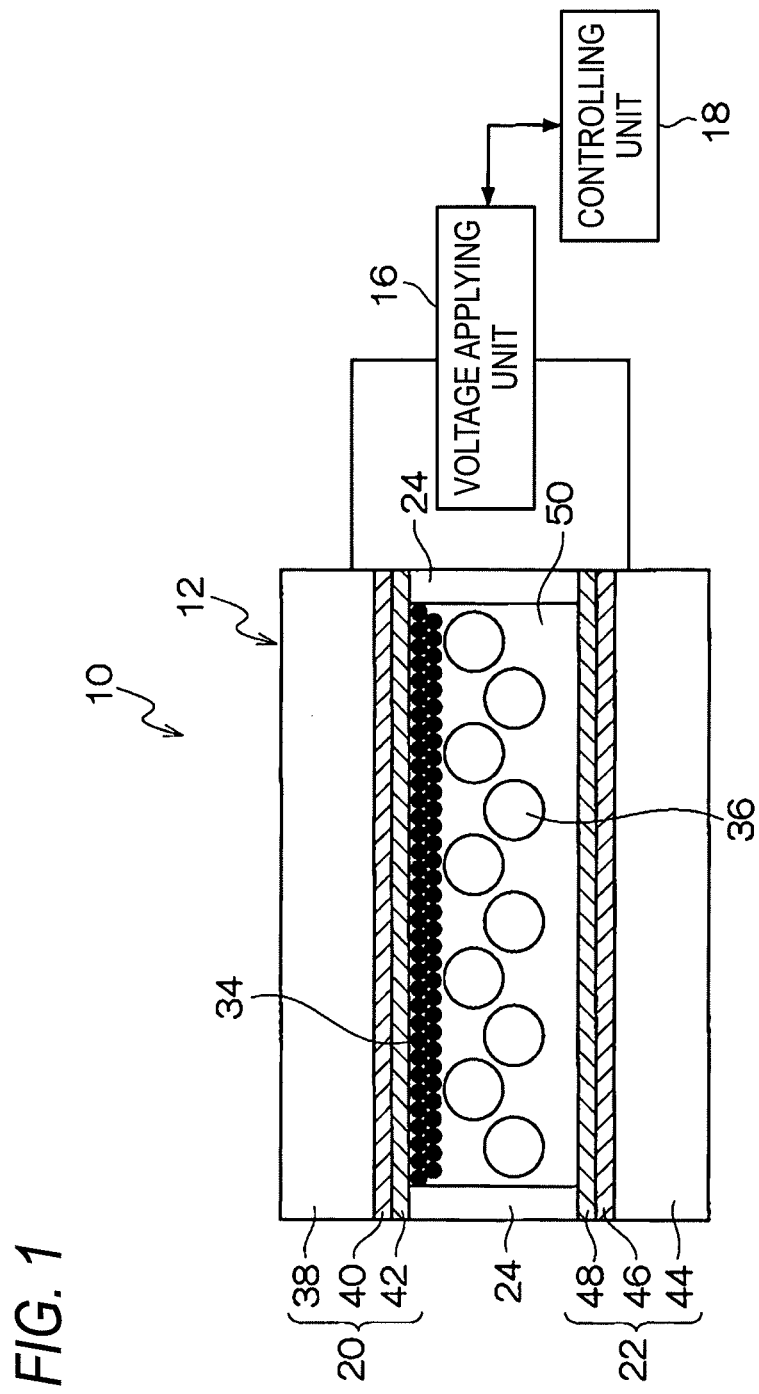

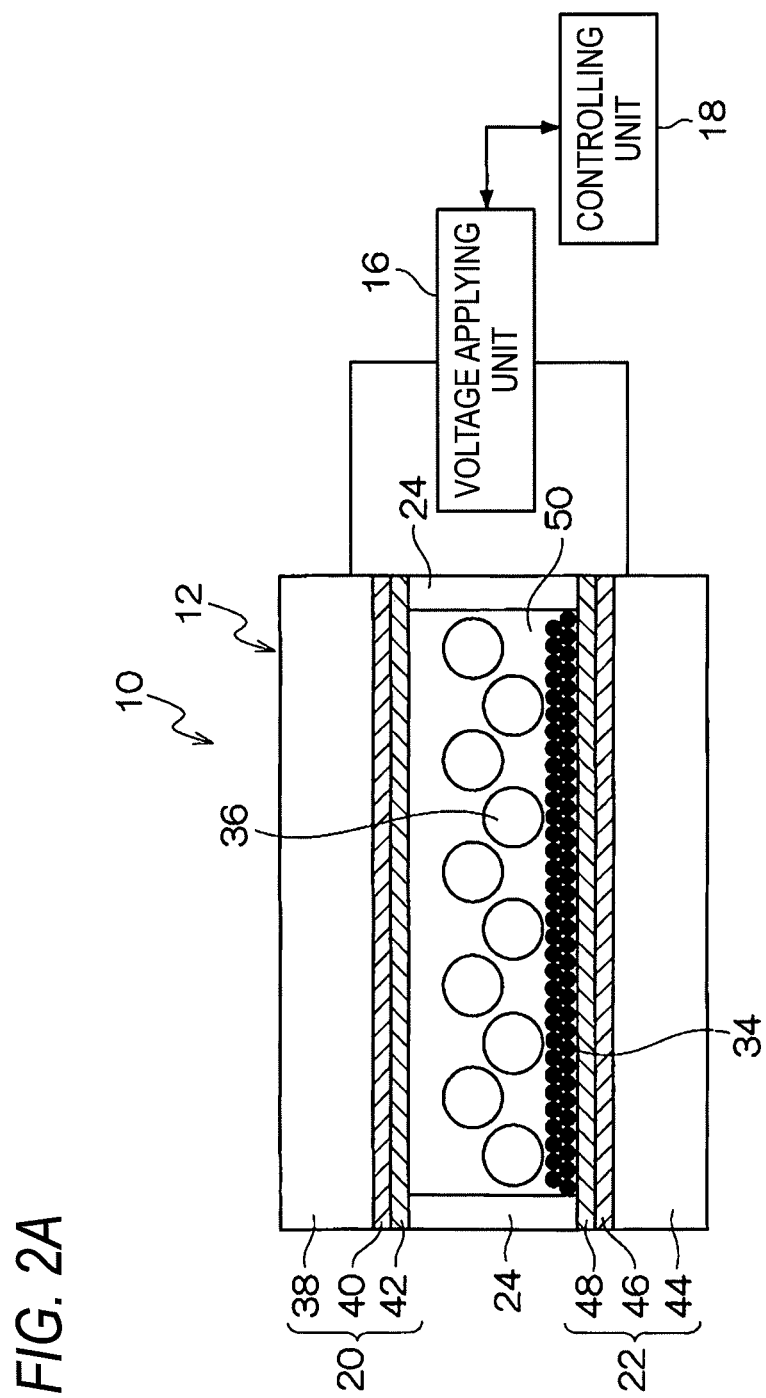

ELECTROPHORETIC PARTICLE, ELECTROPHORETIC PARTICLE DISPERSION LIQUID, DISPLAY MEDIUM, AND DISPLAY DEVICE

CROSS-REFERENCE TO RELATED APPLICATIONS

This application is based on and claims priority under 35 USC 119 from Japanese Patent Application No. 2012-040630 filed on Feb. 27, 2012.

BACKGROUND

1. Field

The present invention relates to an electrophoretic particle, an electrophoretic particle dispersion liquid, a display medium, and a display device.

2. Description of the Related Art

Electrophoretic display media are extensively studied as displays having an image-retaining property (what is called a memory property). In these display systems, display is effected by using charged electrophoretic particles in a liquid and alternately moving the electrophoretic particles to the visual field and the rear field in the cell (having the constitution of superposed two electrode substrates, and the electrophoretic material enclosed together with a dispersion medium between the two electrode substrates) by the application of electric field.

For example, JP-A-2005-227729 (the term "JP-A" as used herein refers to an "unexamined published Japanese patent application") proposes "a charge controlling method of controlling the charging state of particle by introducing to the surface of the particle an organic group having a main structure and a substituent bonding to the main structure, and setting at least one condition of the kind of the substituent, the number of bonds to the main structure and the bonding position, to localize electrons in the main structure to thereby control the charging state of the particle" and "for the main structure to have a part where π electrons are delocalized".

JP-A-2006-106596 proposes "particle for a display medium constituting the display medium for use in a panel for information display to display information by enclosing the display medium between two substrates, at least one of which is transparent, and moving the display medium by the application of an electric field to the display medium, wherein the surface of the particle for the display medium for use in the panel for information display is covered with silica fine particle having a particle size of 450 nm or less by a sol/gel method," and also proposes "to perform surface treatment with a melamine resin for the application of quantity of charge".

JP-A-2009-223080 proposes "a chargeable particle which is obtained by the direct amido-bonding of a carboxyl group of a particle having the carboxyl group and an ethyleneoxy group on the surface thereof to an amino group of a compound having the amino group and a functional group, in the presence of a condensing agent, wherein the amido group having a functional group and the prescribed ethyleneoxy group are directly bonding to the surface of the chargeable particle".

SUMMARY

<1> An Electrophoretic Particle Containing:

a core material particle formed of a composition containing a resin, a nitrogen-containing heterocyclic compound having any one of an imino group, a methylol group and an alkoxymethyl group in the molecule and a heterocyclic ring having a nitrogen atom, and a coloring agent.

BRIEF DESCRIPTION OF THE DRAWINGS

FIG. 1 is a schematic drawing of the display device according to the exemplary embodiment, FIGS. 2A and 2B are drawings typically showing the moving modes of the particles at the time when voltage is applied to between the substrates of the display medium of the display device according to the exemplary embodiment, wherein 10 denotes Display device, 12 denotes Display medium, 16 denotes Voltage applying unit, 18 denotes Controlling unit, 20 denotes Display substrate, 22 denotes Rear substrate, 24 denotes Spacing member, 34 denotes Particle group, 36 denotes Reflecting particle group, 38 denotes Supporting substrate, 40 denotes Surface electrode, 42 denotes Surface layer, 44 denotes Supporting substrate, 46 denotes Rear electrode, 48 denotes Surface layer, and 50 denotes Dispersion medium.

DETAILED DESCRIPTION

Figure 2B:
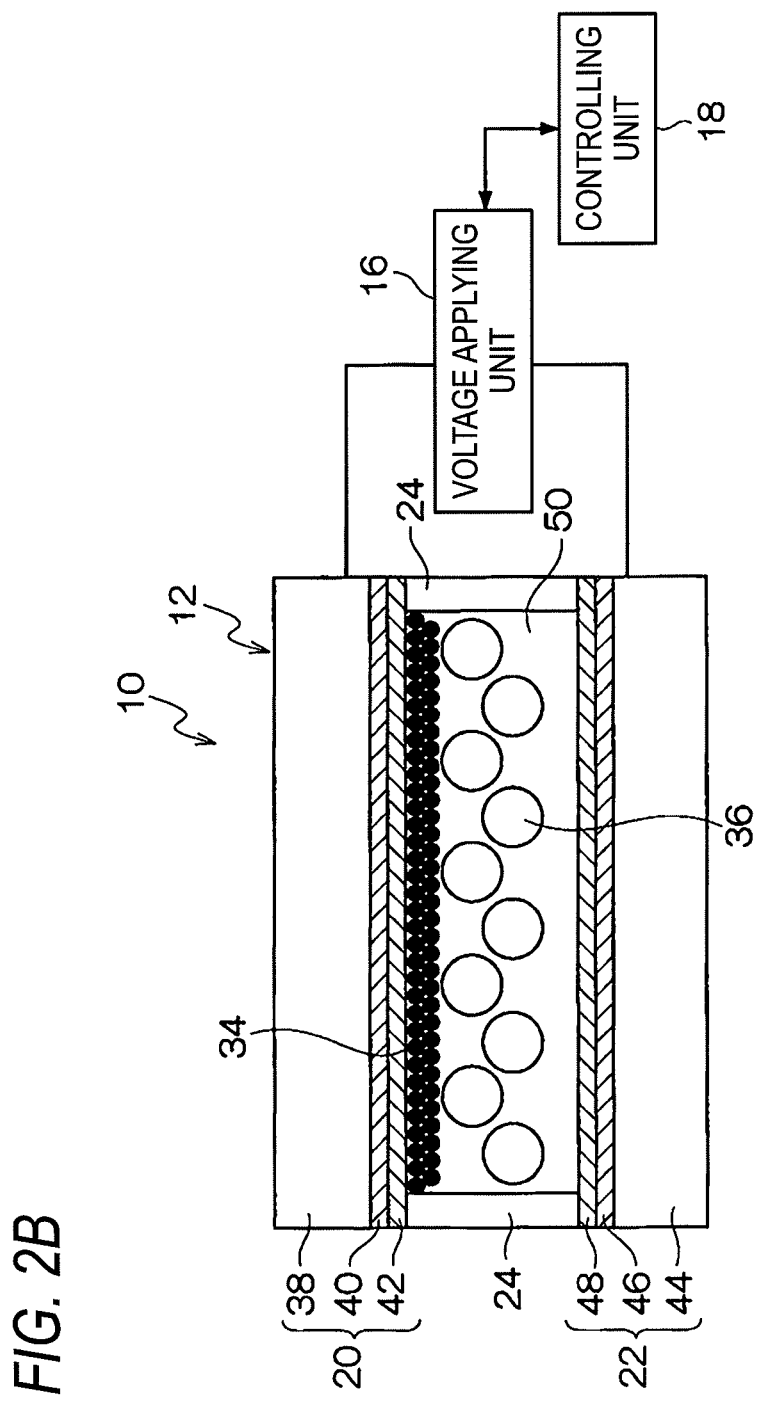

An exemplary embodiment which is one example according to the invention will be described below.

[Electrophoretic Particle]

The electrophoretic particle in the exemplary embodiment contains a core material particle (hereinafter referred to as "a core particle") and a covering layer covering the surface of the core particle.

The core particle is formed of a composition containing a resin, a nitrogen-containing heterocyclic compound having any one of an imino group, a methylol group and an alkoxymethyl group in the molecule and a heterocyclic ring having a nitrogen atom (hereinafter referred to as "a nitrogen-containing heterocyclic compound"), and a coloring agent. Specifically, the core particle is preferably formed of a composition containing a resin, at least one nitrogen-containing heterocyclic compound selected from the group consisting of a melamine compound and a guanamine compound each having any one of an imino group, a methylol group and an alkoxymethyl group in the molecule, and a coloring agent.

On the other hand, the covering layer is formed of a composition containing a resin having a dispersion medium-philic part soluble in a dispersion medium wherein the electrophoretic particle is dispersed and a dispersion medium-phobic part insoluble in a dispersion medium wherein the electrophoretic particle is dispersed. Specifically, the covering layer is preferably formed of a composition containing a resin of a copolymer containing at least a polymerization component having a silicone chain or a polymerization component having an alkyl chain, and a polymerization component having a chargeable group.

Incidentally, of these polymerization components, a hydrophobic site after polymerization deriving from the hydrophobic polymerization component such as a polymerization component having a silicone chain or a polymerization component having an alkyl chain corresponds to the dispersion medium-philic part and a hydrophilic site after polymerization deriving from the hydrophilic polymerization component corresponds to the dispersion medium-phobic part.

In the electrophoretic particle according to the exemplary embodiment, the threshold voltage becomes high by the above constitution. The reason for this is not clear, but is presumed due to the reason that a high quantity of charge is applied to the electrophoretic particle by the presence of a nitrogen-containing heterocyclic compound in the core particle and also by covering the core particle with the covering layer. According to this constitution, when two or more kinds of homopolar electrophoretic particles are used in combination, migration of each electrophoretic particle is liable to be independently realized and, for example, multicolor display in one pixel is liable to be realized.

In particular, it is difficult to give a high quantity of charge to a dispersion medium for dispersing an electrophoretic particle by the chargeable group of the electrophoretic particle in the case of containing a solvent having a low dielectric constant (for example, a dielectric constant of 5.0 or less), although the cause is not clear, and the threshold voltage of the electrophoretic particle is difficult to rises. Even in such a case, the threshold voltage of the electrophoretic particle according to the exemplary embodiment increases by the above constitution, and so effective.

The display media and display device adopting the electrophoretic particle according to the exemplary embodiment can realize display in which display defects attributable to the reduction of quantity of charge of the electrophoretic particle (for example, reduction of display density, mixed color display) are restrained.

Further, in the electrophoretic particle according to the exemplary embodiment, the ratio of the particle of reversed polarity is liable to lower by the above constitution, as a result display in which display defects (for example, reduction of display density, mixed color display) are restrained is easily realized.

The electrophoretic particle according to the exemplary embodiment will be described in detail below.

(Core Particle)

The core particle is formed of the composition containing a resin (hereinafter referred to as "a resin for a core particle"), a nitrogen-containing heterocyclic compound having a heterocyclic ring having a nitrogen atom, and a coloring agent.

Specifically, the core particle may be composed of a composition containing a resin, a nitrogen-containing heterocyclic compound and a coloring agent (i.e., a composition containing a nitrogen-containing heterocyclic compound and a coloring agent dispersed in a resin), or may be a resinous crosslinked product of a composition containing a resin, a nitrogen-containing heterocyclic compound and a coloring agent (i.e., a composition containing a coloring agent dispersed in a resinous crosslinked product of a resin and a nitrogen-containing heterocyclic compound).

In particular, in the case where the core particle is composed of a resinous crosslinked product (a composition containing a resinous crosslinked product of a resin and a nitrogen-containing heterocyclic compound, and a coloring agent), a high quantity of charge is imparted to the electrophoretic particle and the threshold voltage of the electrophoretic particle is liable to heighten. Also, the ratio of the particle of reversed polarity in the electrophoretic particles is liable to lower.

—Resin for Core Particle—

As the resin for the core particle, in view of the manufacture of the electrophoretic particle, a water-soluble resin or an alcohol-soluble resin is preferred. Incidentally, water solubility or alcohol solubility means that the material of the object substance is dissolved in water or an alcohol by 1% by mass or more at 25° C.

When a resinous crosslinked product is formed with a nitrogen-containing heterocyclic compound, it is preferred for the resin for the core particle to have a reactive functional group (e.g., a hydroxyl group, a carboxylic acid group, etc.).

The resin for the core particle may be a chargeable resin (a resin having a chargeable group (e.g., a polarizable functional group, a polar group), or may be non-chargeable resins (a resin not having a chargeable group), but the resin is preferably a chargeable resin in view of the improvement of quantity of charge.

As the chargeable resin, for example, a homopolymer of polymerization component having a chargeable group, and a copolymer of a polymerization component having a chargeable group and a polymerization component not having a chargeable group are exemplified.

On the other hand, as the non-chargeable resin, for example, a homopolymer of a polymerization component not having a chargeable group is exemplified.

These polymerization components may be used alone or two or more kinds may be used in combination.

As the chargeable group (for example, a polar group, a polarizable functional group), a base and an acid group are exemplified.

The base as the chargeable group (hereinafter, a cationic group) includes, for example, an amino group and a quaternary ammonium group (also includes the salts of these groups). These cationic groups have a tendency to give positive charge polarity to the particles.

The acid group as the chargeable group (hereinafter, an anionic group) includes, for example, a phenol group, a carboxyl group, a carboxylate group, a sulfonic acid group, a sulfonate group, a phosphoric acid group, a phosphate group, and a tetraphenylboron group (also includes the salts of these groups). These anionic groups have a tendency to give negative charge polarity to the particles.

In addition to the above, a fluorine group, a phenyl group and a hydroxyl group can be also exemplified as the chargeable groups.

Each of the polymerization components will be described below.

In the following description, "(meth)acrylate" means to include both "acrylate" and "methacrylate".

As the polymerization components having a cationic group (hereinafter, referred to as a cationic polymerization component), the following are exemplified. Specifically, (meth)acrylates having an aliphatic amino group, such as N,N-dimethylaminoethyl(meth)acrylate, N,N-diethylaminoethyl(meth)acrylate, N,N-dibutylaminoethyl(meth)acrylate, N,N-hydroxyethylaminoethyl(meth)acrylate, N,N-ethylaminoethyl(meth)acrylate, N-octyl-N-ethylaminoethyl(meth)acrylate, and N,N-dihexylaminoethyl(meth)acrylate; aromatic substituted ethylene monomers having a nitrogen-containing group, such as dimethylaminostyrene, diethylaminostyrene, dimethylaminomethylstyrene, and dioctylaminostyrene; nitrogen-containing vinyl ether monomers, such as vinyl-N-ethyl-N-phenylaminoethyl ether, vinyl-N-butyl-N-phenylaminoethyl ether, triethanolamine divinyl ether, vinyl diphenyl aminoethyl ether, N-vinyl hydroxyethyl benzamide, and m-aminophenyl vinyl ether; pyrroles, such as vinylamine and N-vinylpyrrole; pyrrolines, such as N-vinyl-2-pyrroline and N-vinyl-3-pyrroline; pyrrolidines, such as N-vinylpyrrolidine, vinylpyrrolidine amino ether, and N-vinyl-2-pyrrolidone; imidazoles, such as N-vinyl-2-methylimidazole; imidazolines, such as N-vinylimidazoline; indoles, such as N-vinylindole; indulines, such as N-vinylindoline; carbazoles such as N-vinylcarbazole and 3,6-dibromo-N-vinylcarbazole; pyridines, such as 2-vinylpyridine, 4-vinylpyridine, and 2-methyl-5-vinylpyridine; piperidines, such as (meth)acrylpiperidine, N-vinylpiperidone, and N-vinylpiperazine; quinolines, such as 2-vinylquinoline and 4-vinylquinoline; pyrazoles, such as N-vinylpyrazole and N-vinylpyrazoline; oxazoles, such as 2-vinyloxazole; and oxazines, such as 4-vinyloxazine and morpholinoethyl(meth)acrylate are exemplified.

The cationic polymerization component may be formed into a quaternary ammonium salt by chloridization before or after polymerization. The quaternary ammonium salt is realized, for example, by the reaction of the cationic group with alkyl halides or tosylates.

As the polymerization components having an anionic group (hereinafter, referred to as an anionic polymerization component), for example, a polymerization component having a carboxylic acid group, a polymerization component having a sulfonic acid group, and a polymerization component having a phosphoric acid group are exemplified.

The examples of the polymerization components having a carboxylic acid group include, for example, (meth)acrylic acid, crotonic acid, itaconic acid, maleic acid, fumaric acid, citraconic acid, anhydrides thereof, monoalkyl esters thereof, vinyl ethers having a carboxyl group such as carboxyethyl vinyl ether, carboxypropyl vinyl ether, and salts thereof.

The examples of the polymerization components having a sulfonic acid group include, for example, styrenesulfonic acid, 2-acrylamido-2-methylpropanesulfonic acid, 3-sulfopropyl(meth)acrylic acid ester, bis(3-sulfopropyl)itaconic acid ester, and salts thereof. As the polymerization components having a sulfonic acid group besides the above, sulfuric monoester and a salt of 2-hydroxyethyl(meth)acrylic acid are also exemplified.

The examples of the polymerization components having a phosphoric acid group include, for example, vinylphosphonic acid, vinyl phosphate, acid phosphoxyethyl(meth)acrylate, acid phosphoxypropyl(meth)acrylate, bis(methacryloxyethyl)phosphate, diphenyl-2-methacryloyloxyethyl phosphate, diphenyl-2-acryloyloxyethyl phosphate, dibutyl-2-methacryloyloxyethyl phosphate, dibutyl-2-acryloyloxyethyl phosphate, and dioctyl-2-(meth)acryloyloxyethyl phosphate.

The anionic polymerization component may be formed into an ammonium salt by chloridization before or after polymerization. The ammonium salt is realized, for example, by the reaction of the anionic group with a tertiary amine or a quaternary ammonium hydroxide.

The examples of the polymerization components having a fluorine group include, for example, (meth)acrylate monomers having a fluorine atom. Specifically, trifluoroethyl (meth)acrylate, pentafluoropropyl(meth)acrylate, perfluoroethyl(meth)acrylate, perfluorobutylethyl(meth)acrylate, perfluorooctylethyl(meth)acrylate, perfluorodecylethyl (meth)acrylate, trifluoromethyltrifluoroethyl(meth)acrylate, and hexafluorobutyl(meth)acrylate are exemplified.

The examples of the polymerization components having a phenyl group include, for example, styrene, phenoxyethylene glycol (meth)acrylate, and 2-hydroxy-3-phenoxypropyl (meth)acrylate.

The examples of the polymerization components having a hydroxyl group include, for example, hydroxyalkyl(meth) acrylate (e.g., hydroxyethyl(meth)acrylate, hydroxypropyl (meth)acrylate), allyl alcohol, and polyethylene glycol mono (meth)acrylate. In addition to the above, those obtained by copolymerizing monomers having a glycidyl group and then ring opening, and those obtained by polymerizing monomers having a t-butoxy group and then hydrolyzing to introduce an OH group are also exemplified.

As the polymerization components not having a chargeable group, non-ionic polymerization components (nonionic polymerization components) are exemplified, for example, (meth)acrylonitrile, (meth)acrylic alkyl ester, (meth)acrylamide, ethylene, propylene, butadiene, isoprene, isobutylene, N-dialkyl-substituted (meth)acrylamide, vinyl carbazole, vinyl chloride, vinylidene chloride, and vinylpyrrolidone are exemplified.

In the resin for the core particle, the polymerization component having a chargeable group accounting for in the total polymerization components in a molar ratio is preferably 1 mol % or more and 98 mol % or less, and more preferably 5 mol % or more and 95 mol % or less.

The weight average molecular weight of the resin for the core particle is preferably 1,000 or more and 1,000,000 or less, and more preferably 10,000 or more and 200,000 or less.

—Nitrogen-Containing Heterocyclic Compound—

The nitrogen-containing heterocyclic compound is a compound to be contained singly or as a crosslinking component not as the polymerization component of a resin having a functional group capable of condensation reaction with the resin contained in the core particle.

As the nitrogen-containing heterocyclic compounds, for example, a melamine compound and a guanamine compound each having any one of an imino group, a methylol group and an alkoxymethyl group in the molecule, are exemplified.

The content of these nitrogen-containing heterocyclic compounds is preferably 0.5% by mass or more and 50% by mass or less, or about 0.5% by mass or more and about 50% by mass or less, more preferably 1% by mass or more and 30% by mass or less or about 1% by mass or more and about 30% by mass or less, and still more preferably 2% by mass or more and 20% by mass or less or about 2% by mass or more and about 20% by mass or less, based on the entire core particles.

When the content of the nitrogen-containing heterocyclic compound is in the above range, a high quantity of charge is given to the electrophoretic particle and the threshold voltage of the electrophoretic particle easily becomes high, and the ratio of the particle of reversed polarity in the electrophoretic particles is also liable to lower.

From the viewpoint of the manufacture of the electrophoretic particle, the nitrogen-containing heterocyclic compound is preferably a water-soluble compound or an alcohol-soluble compound.

Guanamine Compound

The guanamine compound is a compound having a guanamine skeleton (structure), and, for example, acetoguanamine, benzoguanamine, formoguanamine, steroguanamine, spiroguanamine, and cyclohexylguanamine are exemplified.

As the guanamine compound, the compound represented by the following formula (A) and at least one of the multimers thereof are especially preferred. Here, the multimer is an oligomer obtained by polymerization with the compound represented by formula (A) as the structural unit, and the degree of polymerization is 2 to 200, and preferably 2 to 100. The compound represented by formula (A) may be used alone, or may be used in combination of two or more. In particular, when the compound represented by formula (A) is used as mixture of two or more or used as the multimer (oligomer) with the same compound as the structural unit, solubility in a solvent is improved.

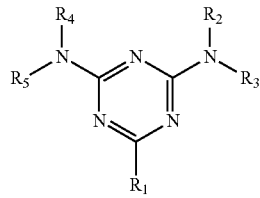
(A)

In formula (A), $R_1$ represents a straight chain or branched alkyl group having 1 to 10 carbon atoms, a substituted or unsubstituted phenyl group having 6 to 10 carbon atoms, or a substituted or unsubstituted alicyclic hydrocarbon group having 4 to 10 carbon atoms; each of $R_2$ to $R_5$ independently represents a hydrogen atom, —$CH_2$—OH or —$CH_2$—O—$R_6$; and $R_6$ represents a straight chain or branched alkyl group having 1 to 10 carbon atoms.

In formula (A), the alkyl group represented by $R_1$ has 1 to 10 carbon atoms, preferably 1 to 8 carbon atoms, and more preferably 1 to 5 carbon atoms. The alkyl group may be straight chain or may be branched.

In formula (A), the phenyl group represented by $R_1$ has 6 to 10 carbon atoms, and preferably 6 to 8 carbon atoms. As the examples of the substituents to be substituted to the phenyl group, e.g., a methyl group, an ethyl group and a propyl group are exemplified.

In formula (A), the alicyclic hydrocarbon group represented by $R_1$ has 4 to 10 carbon atoms, and preferably 5 to 8 carbon atoms. As the examples of the substituents to be substituted to the alicyclic hydrocarbon group, e.g., a methyl group, an ethyl group and a propyl group are exemplified.

In formula (A), in —$CH_2$—O—$R_6$ represented by each of $R_2$ to $R_5$, the alkyl group represented by $R_6$ has 1 to 10 carbon atoms, preferably 1 to 8 carbon atoms, and more preferably 1 to 6 carbon atoms. The alkyl group may be straight chain or branched and, e.g., a methyl group, an ethyl group and a butyl group are preferably exemplified.

The compound represented by formula (A) is particularly preferably a compound in which $R_1$ represents a substituted or unsubstituted phenyl group having 6 to 10 carbon atoms; each of $R_2$ to $R_5$ independently represents —$CH_2$—O—$R_6$; and $R_6$ is preferably selected from a methyl group and an n-butyl group.

The compound represented by formula (A) is, for example, synthesized with guanamine and formaldehyde by a known method (e.g., compiled by The Chemical Society of Japan, Jikken Kagaku Koza (Experimental Chemistry Course), 4$^{th}$ Ed., Vol. 28, page 430).

As the specific examples of the compounds represented by formula (A), Exemplified Compounds (A)-1 to (A)-42 are shown below, but the exemplary embodiment is not restricted thereto. The following specific examples are monomers, but multimers (oligomers) with these monomers as structural units may be used. In the following exemplified compounds, "Me" means a methyl group, "Bu" means a butyl group and "Ph" represents a phenyl group.

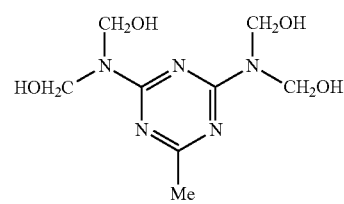
(A)-1

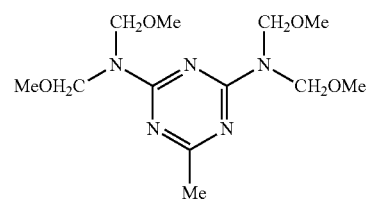
(A)-2

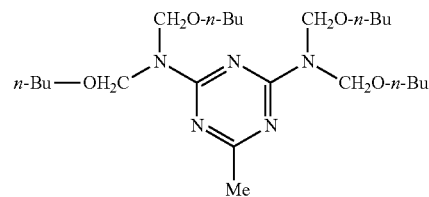
(A)-3

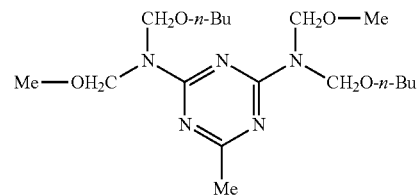
(A)-4

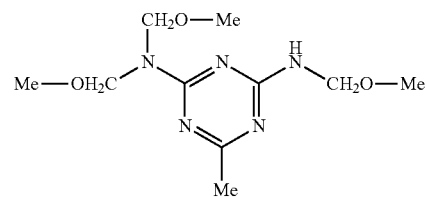
(A)-5

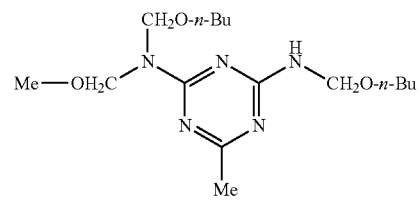
(A)-6

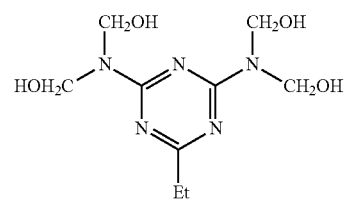
(A)-7

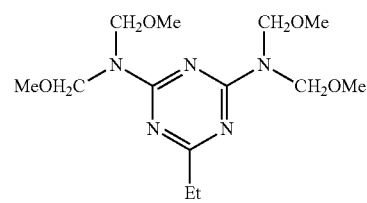
(A)-8

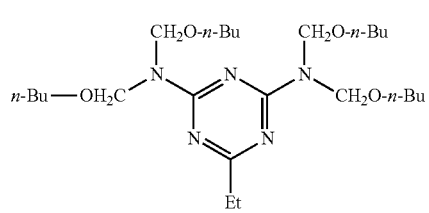
(A)-9
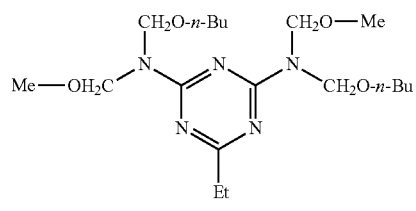
(A)-10
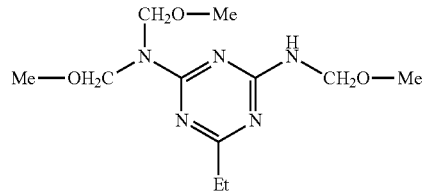
(A)-11
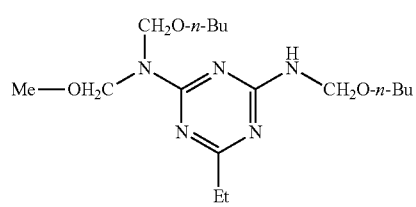
(A)-12
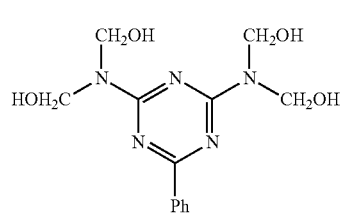
(A)-13
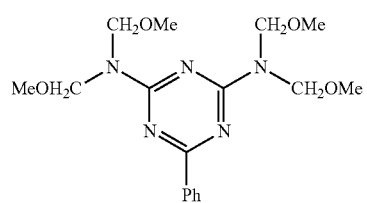
(A)-14
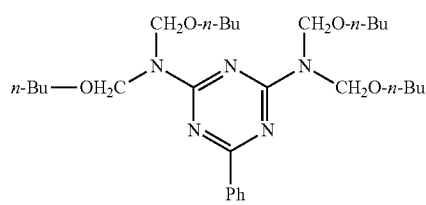
(A)-15
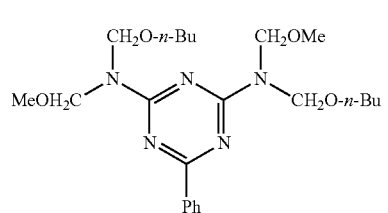
(A)-16
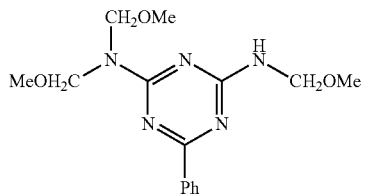
(A)-17
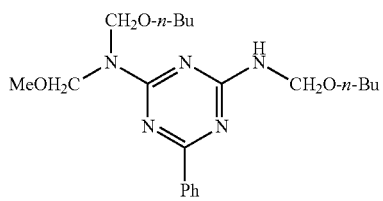
(A)-18
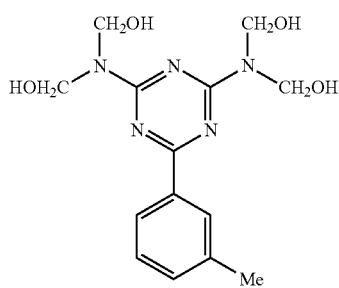
(A)-19
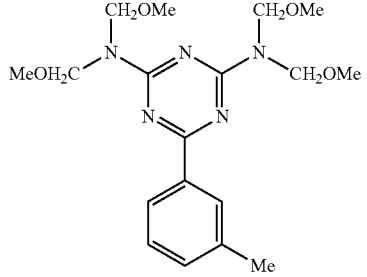
(A)-20
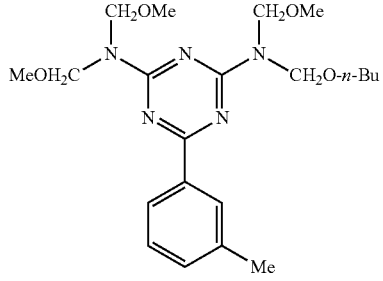
(A)-21
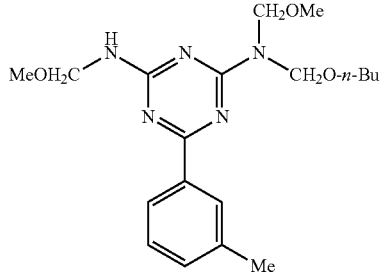
(A)-22

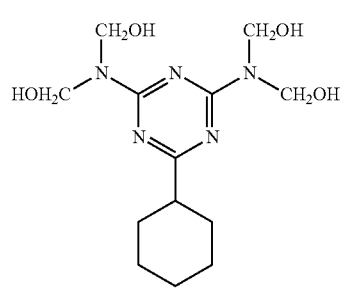
(A)-23
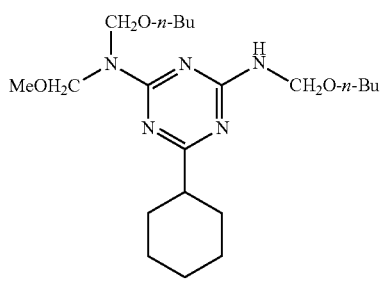
(A)-28
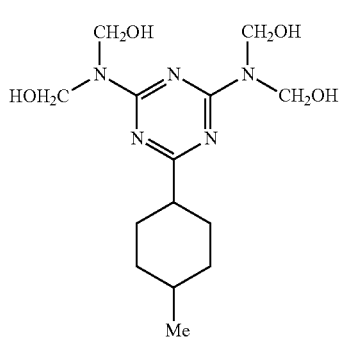
(A)-24
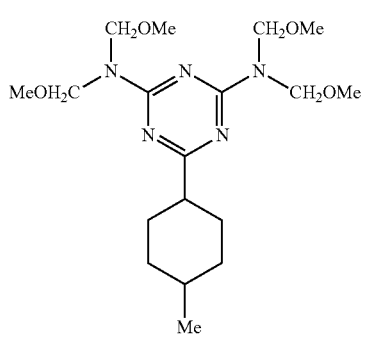
(A)-29
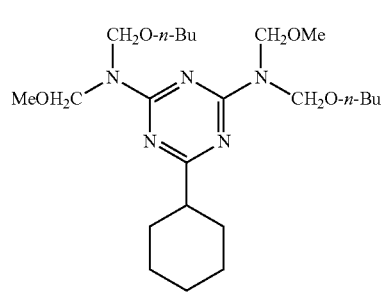
(A)-25
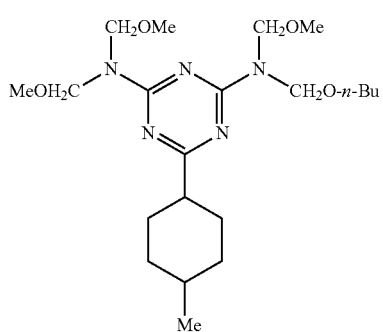
(A)-30
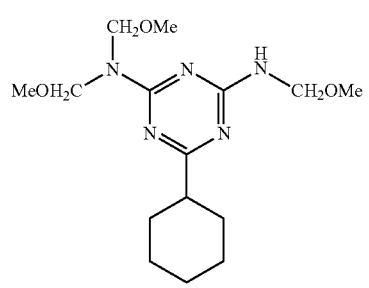
(A)-26
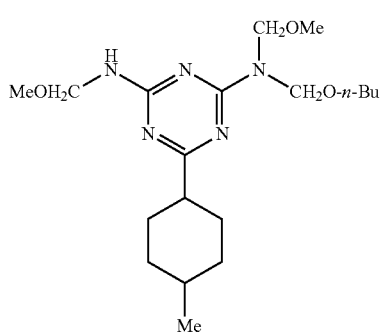
(A)-31
(A)-27
(A)-32

-continued

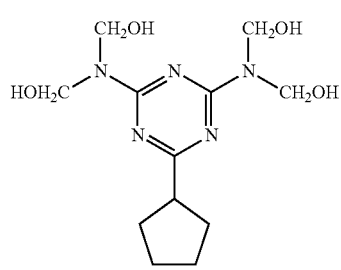
(A)-33

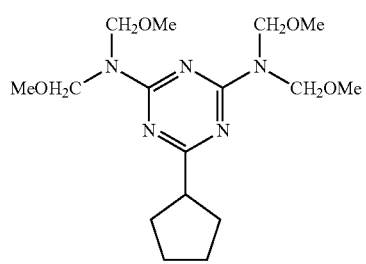
(A)-34

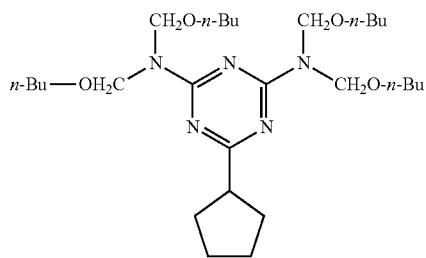
(A)-35

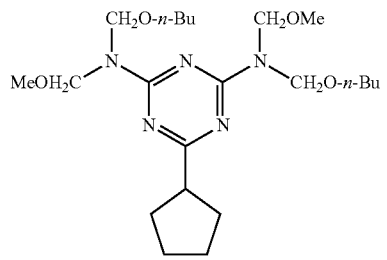
(A)-36

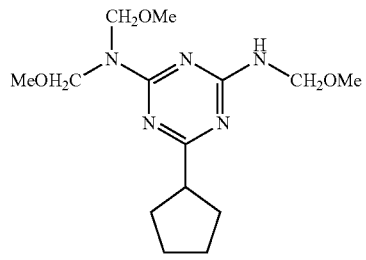
(A)-37

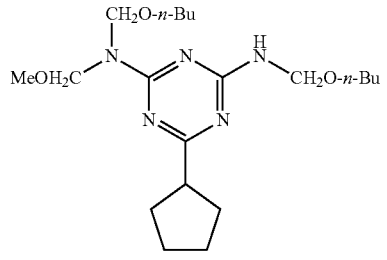
(A)-38

-continued

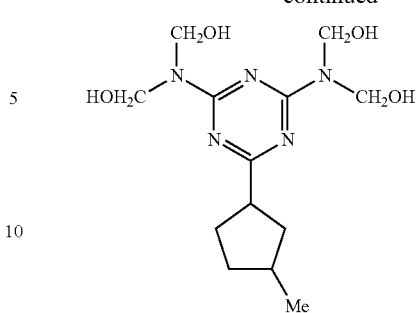
(A)-39

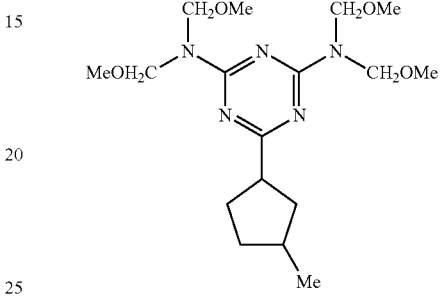
(A)-40

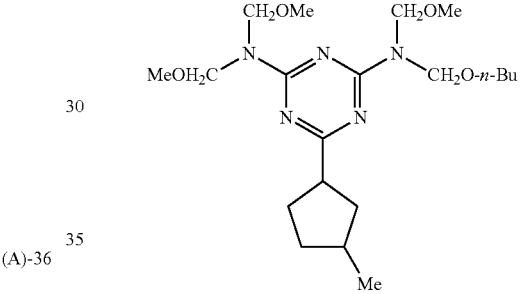
(A)-41

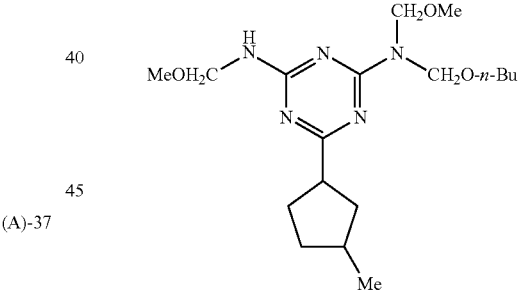
(A)-42

As commercially available products of the compound represented by formula (A), for example, SUPER BECKAMINE (R) L-148-55, SUPER BECKAMINE (R) 13-535, SUPER BECKAMINE (R) L-145-60, SUPER BECKAMINE (R) TD-126 (products manufactured by DIC Corporation), NIKALAC MW-390, NIKALAC BL-60 and NIKALAC BX-4000 (products manufactured by Sanwa Chemical Co., Ltd.) are exemplified.

After synthesis of the compounds represented by formula (A) (including multimers) or purchase of commercially available products, for removing the influences of the residual solvents, they may be dissolved in an appropriate solvent, such as toluene, xylene or ethyl acetate, and washed with distilled water or ion exchange water, or may be subjected to treatment with an ion exchange resin for removal.

Melamine Compound

The melamine compound is a compound having a melamine skeleton (structure), and the compound represented by the following formula (B) and at least any of the multimers thereof are especially preferred. Here, similarly to formula (A), the multimer is an oligomer obtained by polymerization with the compound represented by formula (B) as the structural unit, and the degree of polymerization is 2 to 200, and preferably 2 to 100. The compound represented by formula (B) or the multimer thereof may be used alone, or may be used in combination of two or more. Further, the compound represented by formula (B) may be used in combination with the compound represented by formula (A) or the multimer thereof. In particular, when the compound represented by formula (B) is used as mixture of two or more or used as the multimer (oligomer) with the same compound as the structural unit, solubility in a solvent is improved.

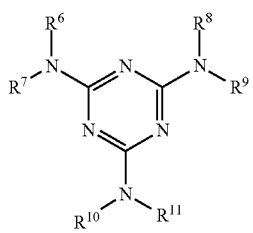

(B)

In formula (B), each of $R^6$ to $R^{11}$ independently represents a hydrogen atom, $-CH_2-OH$, $-CH_2-O-R^{12}$, or $-O-R^{12}$; and $R^{12}$ represents an alkyl group having 1 to 5 carbon atoms which may be branched. As the alkyl groups, a methyl group, an ethyl group and a butyl group are exemplified.

The compound represented by formula (B) is synthesized by any of known methods with, for example, melamine and formaldehyde (similarly synthesized to the melamine resin in, e.g., Jikken Kagaku Koza (Experimental Chemistry Course), 4$^{th}$ Ed., Vol. 28, page 430).

As the specific examples of the compounds represented by formula (B), Exemplified Compounds (B)-1 to (B)-8 are shown below, but the exemplary embodiment is not restricted thereto. The following specific examples are shown in the form of monomers, but multimers (oligomers) with these compounds as structural units may also be used.

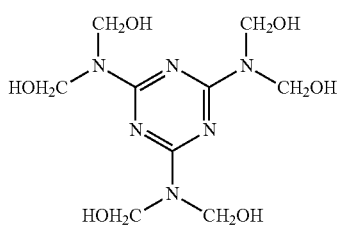

(B)-1

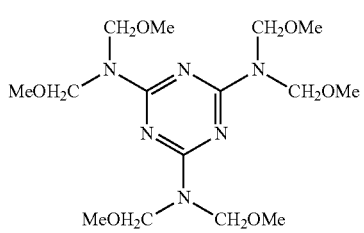

(B)-2

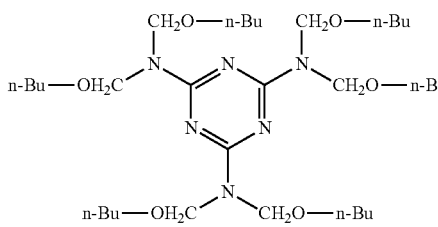

(B)-3

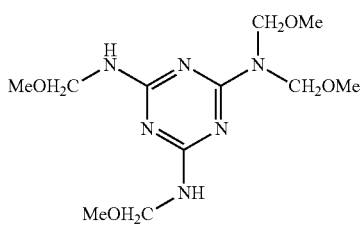

(B)-4

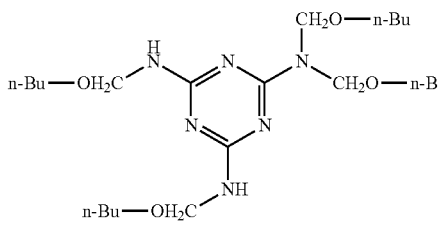

(B)-5

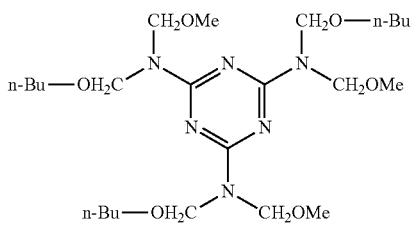

(B)-6

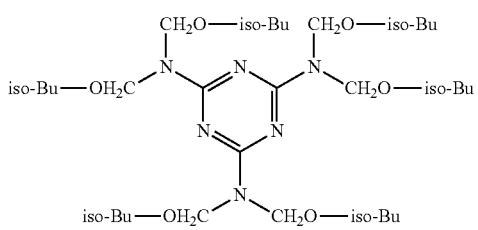

(B)-7

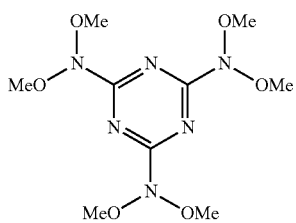

(B)-8

As commercially available products of the compound represented by formula (B), SUPER MELAMINE No. 90 (manufactured by Nichiyu Chemical Co., Ltd.), SUPER BECKAMINE (R) TD-139-60 (manufactured by DIC Corporation), YUBAN 2020 (manufactured by Mitsui Chemical Co., Ltd.), SUMITEX RESIN M-3 (manufactured by Sumitomo Chemical Co., Ltd.), NIKALAC MW-390 and NIKALAC MW-30 (manufactured by Sanwa Chemical Co., Ltd.) are exemplified.

After synthesis of the compounds represented by formula (B) (including oligomers) or purchase of commercially available products, for removing the influences of the residual solvents, they may be dissolved in an appropriate solvent, such as toluene, xylene or ethyl acetate, and washed with distilled water or ion exchange water, or may be subjected to treatment with an ion exchange resin for removal.

Other Nitrogen-Containing Heterocyclic Compounds

As other nitrogen-containing heterocyclic compounds, those obtained by substituting the triazine rings of the melamine compound and guanamine compound with other nitrogen-containing heterocyclic ring are exemplified. As other nitrogen-containing heterocyclic rings, for example, a pyrrole ring, an imidazole ring, a pyrazole ring, an oxazole ring, a furazane ring, a piperidine ring, a pyridine ring, a pyrazine ring, a piperazine ring, a pyrimidine ring, a pyridazine ring, a morpholine ring, a pyrrolidine ring, a pyrindine ring, an indolizine ring, an indole ring, an indazole ring, a purine ring, a quinolizine ring, a quinoline ring, a diazanaphthalene ring, a naphthyridine ring, a phthalazine ring, a naphthyridine ring, a quinoxaline ring, a quinazoline ring, a cinnoline ring, a pteridine ring, a carbazole ring, a carboline ring, a perimidine ring, a phenanthroline ring, and an anthyridine ring are exemplified.

Since the melamine compounds, the guanamine compounds and the above other nitrogen-containing heterocyclic compounds contain at least any one of an imino group, a methylol group and an alkoxymethyl group in the molecule, it is possible that they are subjected to condensation reaction with the resin contained in the core particle.

Specifically, for example, the condensation reaction represented by any of the following reaction formulae is possible.

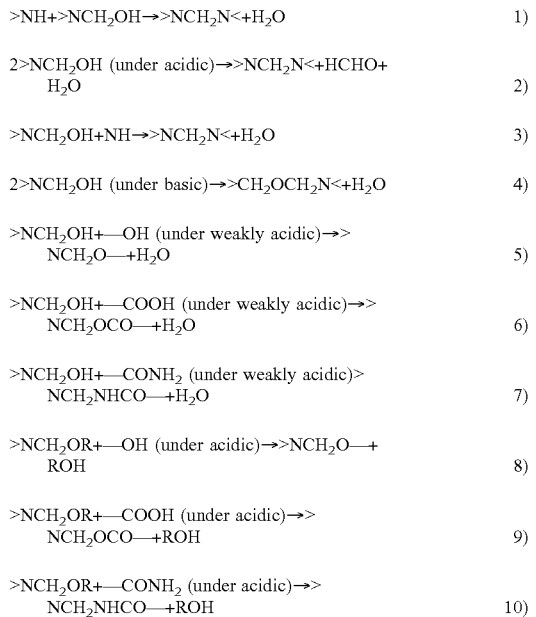

The nitrogen-containing heterocyclic compounds which are possible to cause these condensation reactions have an advantage such that the degree of freedom of manufacture is enlarged, since these compounds are resinified by self condensation reaction by simple operation such as heating after granulation of core particles, or three dimensional crosslinking is realized by the condensation reaction with the resin for the core particle. Further, they have such an advantage that the restriction by solvents is small, since increase in viscosity and reduction of solubility hardly occur in granulating a core particle as compared with compounds which are possible to cause radical reaction. In addition, as compared with compounds which are possible to cause radical reaction, it is also advantageous that increase in unreacted products and heterogeneous reaction hardly occur.

In particular, the melamine compounds, the guanamine compounds and the above other nitrogen-containing heterocyclic compounds can easily have multifunctional groups and are liable to be tenacious in the resinous crosslinking structure of the core particle. Incidentally, to make a vinyl group multifunctional results in complexity and strictness of synthesis conditions and increase in manufacturing costs in many cases.

—Coloring Agent—

As coloring agents, organic or inorganic pigments and oil-based dyes are exemplified. For example, magnetic powders, e.g., magnetite and ferrite, and known coloring agents, e.g., carbon black, titanium oxide, magnesium oxide, zinc oxide, phthalocyanine copper-based cyan coloring materials, azo-based yellow coloring materials, azo-based magenta coloring materials, quinacridone-based magenta coloring materials, red coloring materials, green coloring materials and blue coloring materials are exemplified. Specifically, Aniline Blue, Chalcoyl Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Blue 15:1, and C.I. Pigment Blue 15:3 are representative coloring agents.

The compounding amount of a coloring agent is preferably 10% by mass or more and 99% by mass or less based on the resin in the core particles, and more preferably 30% by mass or more and 99% by mass or less.

—Other Compounding Materials—

The core particle may contain other compounding materials.

As other compounding materials, for example, charge controlling materials and magnetic materials are exemplified.

As the charge controlling materials, well-known materials which are used as electrophotographic toner materials can be used, and the examples include cetylpyridyl chloride, quaternary ammonium salts, such as BONTRON P-51, BONTRON P-53, BONTRON E-84, and BONTRON E-81 (products manufactured by Orient Chemical Industries, Ltd.), salicylic acid-based metal complexes, phenol-based condensates, tetraphenyl-based compounds, oxide metal particles, and oxide metal particles having been subjected to surface treatment with various kinds of coupling agents.

As the magnetic materials, color-coated inorganic or organic magnetic materials are used according to necessity. Transparent magnetic materials, in particular, transparent organic magnetic materials hardly inhibit color development of coloring pigments and the specific gravity thereof is smaller as compared with inorganic magnetic materials, accordingly they are very preferably used.

As the colored magnetic materials (color-coated materials), for example, small particle size colored magnetic powder disclosed in JP-A-2003-131420 is exemplified. Colored magnetic materials containing magnetic particles as cores and colored layers laminated on the surfaces of the magnetic particles are used. As the colored layers, the magnetic particles may be coated with a pigment and the like opaquely, but it is preferred, for example, to use a light interference thin film. The light interference thin film is a thin film formed from a colorless material such as $SiO_2$ or $TiO_2$ and having a thickness equivalent to the wavelength of light, and selectively reflects the wavelength of light by light interference in the thin film.

—Preferred Constitution of a Core Particle—

As the above-described core particle, the constitution containing 1) styrene-acrylic resin, 2) hydroxylalkyl-ammonium resin, and 3) acrylic resin is especially preferred.

As the constitution of the above-described core particle, it is particularly preferred to contain the melamine compound represented by formula (B) as the nitrogen-containing heterocyclic compound.

It is also particularly preferred constitution of the above-described core particle to contain a crosslinked product of the resin for the core particle and the nitrogen-containing heterocyclic compound.

(Covering Layer)

The covering layer is formed of a composition containing a resin having a dispersion medium-philic part soluble in a dispersion medium wherein electrophoretic particles are dispersed and a dispersion medium-phobic part insoluble in a dispersion medium wherein electrophoretic particles are dispersed (the resin is hereinafter referred to as "a resin for covering layers").

Here, the dispersion medium-philic part of the resin for covering layers means the part of the polymerization component for constituting the dispersion medium-philic part which is soluble in the dispersion medium. To be soluble in dispersion medium means that the material of the object is dissolved in the dispersion medium by 1% by mass or more at 25° C.

On the other hand, the dispersion medium-phobic part of the resin for a covering layer means the part of the polymerization component for constituting the dispersion medium-phobic part which is insoluble in the dispersion medium. To be insoluble in dispersion medium means that the material of the object is dissolved in the dispersion medium by 0.01% by mass or more at 25° C.

From the viewpoint of the manufacture of the electrophoretic particle, it is preferred to constitute the covering layer such that the resin for covering layers is soluble in a dispersion medium as the resin alone (i.e., before covering a core particle) and insoluble in the dispersion medium after covering the core particle.

For realizing such a constitution, for example, a method of crosslinking of the resin for a covering layer, a method of bonding of the resin to the surface of the core particle, and a method of multipoint adsorption of the resin onto the surface of the core particle are exemplified.

—Resin for a Covering Layer—

As the resin for the covering layer, specifically, for example, a resin composed of a copolymer containing a polymerization component having a silicone chain or a polymerization component having an alkyl chain, a polymerization component having a chargeable group and, if necessary, other polymerization component are exemplified.

The covering layer may be constituted by containing a non-crosslinking resin or may be constituted by containing the crosslinked product of a resin.

That is, the covering layer may be formed from a composition containing a resin or may be formed from a resinous crosslinked product of a composition containing a resin.

In particular, in the case where the covering layer are composed of a resinous crosslinked product, a high quantity of charge is imparted to an electrophoretic particle and the threshold voltage of the electrophoretic particle is liable to heighten. Also, the ratio of the particle of reversed polarity in the electrophoretic particles is liable to lower.

As methods of crosslinking the resin for a covering layer, a method of crosslinking a resin by polymerizing a polymerization component having a reactive group (a crosslinking group), and a method of crosslinking a resin by adding a crosslinking agent separately from the resin are given.

Polymerization Components Having a Silicone Chain

The polymerization component having a silicone chain (a monomer having a silicone chain) is, for example, a macromonomer having a silicone chain. Specifically, for example, dimethyl silicone monomers having a (meth)acrylate group on one terminal (a silicone compound represented by the following structural formula (1)), and, for example, SILAPLANE FM-0711, FM-0721, FM-0725 (manufactured by Chisso Corporation), and X-22-174DX, X-22-2426, X-22-2475 (manufactured by Shin-Etsu Chemical Co., Ltd.) are exemplified.

Structural Formula (1)

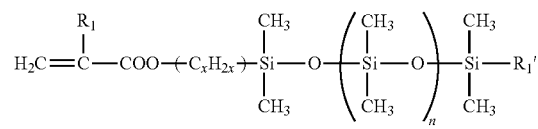

In structural formula (I), $R_1$ represents a hydrogen atom or a methyl group; $R_1'$ represents a hydrogen atom or an alkyl group having 1 to 4 carbon atoms; n represents a natural number (e.g., 1 or more and 1,000 or less, and preferably 3 or more and 100 or less), and x represents an integer of 1 to 3.

Polymerization Component Having an Alkyl Chain

As the polymerization component having an alkyl chain, for example, long chain alkyl(meth)acrylates are exemplified. As the long chain alkyl(meth)acrylates, those having an alkyl chain of 4 or more carbon atoms are preferred, and the examples thereof include butyl(meth)acrylate, hexyl(meth)acrylate, 2-ethylhexyl(meth)acrylate, dodecyl(meth)acrylate, and stearyl(meth)acrylate.

Incidentally, long chain alkyl means, for example, an alkyl chain having about 4 to about 30 carbon atoms.

Polymerization Component Having a Chargeable Group

The polymerization component having a chargeable group is the same with the polymerization component having a chargeable group described as the polymerization components of the resin for the core particle.

Other Polymerization Components

As other polymerization components, polymerization components not having a chargeable group and polymerization components having a reactive group are given.

The polymerization components not having a chargeable group are the same with the polymerization components not having a chargeable group described as the polymerization components of the resin for the core particle.

As the polymerization component having a reactive group, for example, glycidyl (meth)acrylate having an epoxy group, isocyanate-based monomers having an isocyanate group [e.g., KARENZ AOI (2-isocyanate ethyl acrylate), and KARENZ MOI (2-isocyanate ethyl methacrylate), manufactured by Showa Denko K.K.], isocyanate-based monomers having a blocked isocyanate group [e.g., KARENZ MOI-BM [2-[0-(1'-methylpropylideneamino)carboxyamino]ethyl methacrylate, and KARENZ MOI-BP [2-[(3,5-dimethylpyrazolyl)carbonylamino]ethyl methacrylate, manufactured by Showa Denko K.K.] are exemplified.

Incidentally, the blocked isocyanate group is in the state under reaction with the substituent which is desorbed by heating, by which the reactivity of the isocyanate group is restrained, and when the substituent is desorbed by heating, the isocyanate group is brought into the state to cause reaction.

When such a polymerization component having a reactive group is used as the polymerization component of the resin for the covering layer, the resin for the covering layer itself is crosslinked and, as a result, the covering layer is to be constituted of the resinous crosslinked product. Further, the reactive group of the resin for the covering layer and the functional group on the surface of the core particle are bonded, and the covering layer is to be covered with the core particle.

The polymerization component having a reactive group may be added to the reaction system as the crosslinking agent for the crosslinking of the resin for the covering layer separately from the resin for the covering layer, other than for use as the polymerization component of the resin for covering layer.

In the resin for the covering layer, the polymerization component having a silicone chain accounting for in the total polymerization components in a molar ratio is preferably 1 mol % or more and 90 mol % or less, and more preferably 5 mol % or more and 50 mol % or less.

In the resin for the covering layer, the polymerization component having a chargeable group accounting for in the total polymerization components in a molar ratio is preferably 10 mol % or more and 99 mol % or less, and more preferably 50 mol % or more and 95 mol % or less.

In the resin for the covering layer, the polymerization component having a reactive group accounting for in the total polymerization components in a molar ratio is preferably 0.1 mol % or more and 50 mol % or less, and more preferably 0.5 mol % or more and 30 mol % or less.

The use amount of a crosslinking agent for obtaining a resinous crosslinked product is preferably 0.1% by mass or more and 70% by mass or less, and more preferably 1% by mass or more and 50% by mass or less, based on the resin for the covering layer.

The weight average molecular weight of the resin for the covering layer is preferably 500 or more and 1,000,000 or less, and more preferably 1,000 or more and 1,000,000 or less.

—Other Compounding Materials—

The covering layers may contain other compounding materials.

As other compounding materials, for examples, modified silicones having functional groups on the side chains, main chain, terminals, or the sites of combinations of them are exemplified. The examples of the functional groups include an acryl group, an amino group, a carboxyl group, a hydroxyl group, an epoxy group, an alkyl group, a phenyl group, an ester group, an amido group, and ether structure group.

—Characteristics of Covering Layer—

The covering amount of the covering layer on the surface of the core particle is 0.00001% by mass or more and 50% by mass or less based on the core particle, and is preferably 0.0001% by mass or more and 10% by mass or less.

—Preferred Constitution of Covering Layer—

As the constitution of the above-described covering layer, it is especially preferred to contain the following resin as the resin for the covering layer: 1) silicone macromer, (meth) acrylic acid, (meth)acrylate, blocked isocyanate resin, 2) silicone macromer, hydroxyalkyl(meth)acrylate, blocked isocyanate resin, 3) silicone macromer, hydroxyalkyl(meth) acrylate, (meth)acrylic acid phenoxyalkylene glycol, blocked isocyanate resin, and 4) silicone macromer, hydroxyalkyl(meth)acrylate, amino group-containing (meth)acrylate, blocked isocyanate resin.

(Characteristics of an Electrophoretic Particle)

The average particle size (the volume average particle size) of the electrophoretic particle according to the exemplary embodiment is, for example, 0.1 µm or more and 10 µm or less, but the average particle size is selected depending upon the use and not restricted thereto.

The average particle size is measured with Photal FPAR-1000 (a dynamic light scattering particle size distribution measuring apparatus, manufactured by Otsuka Electronics Co., Ltd.), and analyzed by MARQUARDT method.

(Manufacturing Method of an Electrophoretic Particle)

As one example of the manufacturing method of the electrophoretic particle in the exemplary embodiment, the following method is given, but the embodiment is not restricted thereto.

In the first place, a resin for a core particle, a nitrogen-containing heterocyclic compound, a coloring agent and other compounding materials are dissolved in a first solvent to prepare a mixed solution in which the resin for the core particle and the nitrogen-containing heterocyclic compound are dissolved.

Here, the first solvent is a good solvent capable of forming a dispersion phase in the later-described second solvent (a poor solvent capable of forming a continuous phase). The first solvent has a boiling temperature lower than that of the second solvent and the first solvent is selected from among the solvents capable of dissolving the resin for core particles and the nitrogen-containing heterocyclic compound.

As the first solvent, for example, water, isopropyl alcohol (IPA), methanol, ethanol, butanol, tetrahydrofuran, ethyl acetate and butyl acetate are exemplified.

In the next place, the obtained mixed solution is mixed with the second solvent, stirred, and emulsified to prepare an emulsion liquid with the second solvent as continuous phase.

The first solvent in the emulsion liquid is removed by heating or the like (dried) to precipitate the resin for the core particle and the nitrogen-containing heterocyclic compound to thereby obtain the core particle (core particle dispersed in the second solvent) as a particulate product containing, with the foregoing components, a coloring agent and other compounding materials.

The second solvent is a poor solvent capable of forming a continuous phase as against the first solvent capable of forming a dispersion phase. The second solvent has a boiling temperature higher than that of the first solvent and the second solvent is selected from among the solvents in which the resin for the core particle and the nitrogen-containing heterocyclic compound are insoluble.

A dispersion medium for dispersing the electrophoretic particle to be obtained is exemplified as the second solvent.

Subsequently, the resin for the covering layer and other compounding materials are mixed with the third solvent to prepare a mixed solution in which the resin for the covering layer is dissolved.

Here, the third solvent is also a good solvent capable of forming a dispersion phase in the second solvent (a poor solvent capable of forming a continuous phase). The third solvent has a boiling temperature lower than that of the second solvent and the third solvent is selected from among the solvents capable of dissolving the resin for the covering layer. It is also preferred to select the third solvent from among the solvents in which the resin for the core particle and the nitrogen-containing heterocyclic compound are insoluble.

As the third solvents, for example, water, isopropyl alcohol (IPA), methanol, ethanol, butanol, tetrahydrofuran, ethyl acetate and butyl acetate are also exemplified.

In the next place, the obtained mixed solution is mixed with the second solvent in which the core particles are dispersed, stirred, and emulsified to prepare an emulsion liquid with the second solvent as continuous phase.

The third solvent in the emulsion liquid is removed by heating or the like (dried) to precipitate the resin for the covering layer on the surface of the core particle to form the covering layer containing, with the resin for the covering layer, other compounding materials on the surface of the core particle.

After that, in the case where the core particle and the covering layer are formed with a resinous crosslinked product, heat treatment is performed for crosslinking the resin.

Thus, the electrophoretic particle containing the covering layer formed on the surface of the core particle and an electrophoretic particle dispersion liquid containing the electrophoretic particle are obtained.

If necessary, the obtained electrophoretic particle may be diluted, for example, with a dispersion medium (a solvent). For obtaining an electrophoretic particle dispersion liquid containing two or more kinds of electrophoretic particles, two or more kinds of dispersion liquids are prepared and then mixed the obtained dispersion liquids.

[Electrophoretic Particle Dispersion Liquid]

The electrophoretic particle dispersion liquid according to the exemplary embodiment contains a dispersion medium and an electrophoretic particle dispersed in the dispersion medium, which contains the electrophoretic particle according to the exemplary embodiment.

A dispersion medium is not especially restricted, but it is preferred to be selected from among solvents having a low dielectric constant (for example, a dielectric constant of 5.0 or less, and preferably 3.0 or less). Solvents other than the solvents having a low dielectric constant may be used in combination as a dispersion medium, but it is preferred to contain 50% by volume or more of a low dielectric constant solvent. Dielectric constant of a low dielectric constant solvent can be found with a dielectric constant meter (manufactured by Nihon Rufuto Co., Ltd.).

As a solvent having a low dielectric constant, for example, solvents having a high boiling temperature deriving from petroleum, such as paraffin-based hydrocarbon solvent, silicone oil and fluorine-based liquid are exemplified.

A solvent having a low dielectric constant is preferably selected depending upon the kind of the polymerization component of the resin for a covering layer of the electrophoretic particle. Specifically, in the case where a component having a silicone chain is used as the polymerization component of the resin for the covering layer, silicone oil is preferred as the dispersion medium. Further, when a component having an alkyl chain is used as the polymerization component of the resin for the covering layer, it is preferred to select a paraffin-based hydrocarbon solvent as the dispersion medium.

However, the exemplary embodiment is not restricted thereto. For example, even when a component having a silicone chain is used as the polymerization component of the resin for the covering layer, a paraffin-based hydrocarbon solvent may be selected as the dispersion medium.

As silicone oils, silicone oils in which a hydrocarbon group is bonded to a siloxane bond (e.g., dimethyl silicone oil, diethyl silicone oil, methylethyl silicone oil, methylphenyl silicone oil, and diphenyl silicone oil) are specifically exemplified. Of these silicone oils, dimethyl silicone oil is especially preferred.

As paraffin-based hydrocarbon solvents, n-paraffin-based hydrocarbon having 20 or more carbon atoms (having a boiling temperature of 80° C. or more) and isoparaffin-based hydrocarbon are exemplified. In view of safety and volatility, it is preferred to use isoparaffin. Specifically, SHELLSOL 71 (manufactured by Shell Oil Co.), ISOPAR O, ISOPAR H, ISOPAR K, ISOPAR L, ISOPAR G, and ISOPAR M (ISOPAR is the trade name of Exxon Chemical Corp.), and IP Solvent (manufactured by Idemitsu Petrochemical Co., Ltd.) are exemplified.

To the electrophoretic particle dispersion liquid according to the exemplary embodiment, if necessary, acid, alkali, salt, a dispersant, a dispersion stabilizer, in addition, a stabilizer, an antibacterial agent and an antiseptic for the purpose of prevention of oxidation and ultraviolet absorption may be added. Further, a charge controlling agent may be added to the electrophoretic particle dispersion liquid according to the exemplary embodiment.

The concentration of the electrophoretic particle in the electrophoretic particle dispersion liquid according to the exemplary embodiment is variously selected depending upon display characteristics and response characteristics, but it is preferably selected in the range of 0.1% by mass or more and 30% by mass or less. When particles different in colors are mixed, the gross of the particles is preferably within this range.

The electrophoretic particle dispersion liquid according to the exemplary embodiment is used for a display medium of electrophoretic system, a light-modulating medium (a light-modulating device) of electrophoretic system, and a liquid toner of liquid development type electrophotographic system. Incidentally, as the display medium of electrophoretic system and a light-modulating medium (a light-modulating device) of electrophoretic system, there are a well-known system of moving the particle group in the direction opposite to the electrode (substrate), a system of moving in the direction along the electrode (substrate) (what is called an in-plane system) different from the above, and a hybrid device of combining these systems.

In the electrophoretic particle dispersion liquid according to the exemplary embodiment, color display is realized by using a plurality of kinds of electrophoretic particles different in colors and charge polarities as mixture.

[Display Medium and Display Device]

One example of display medium and display device according to the exemplary embodiment will be described below.

FIG. 1 is a schematic drawing of the display device according to the exemplary embodiment. FIGS. 2A and 2B are drawings typically showing the moving modes of the particles at the time when voltage is applied to between the substrates of the display medium of the display device according to the exemplary embodiment.

The display device 10 according to the exemplary embodiment takes the form of using the electrophoretic particle dispersion liquid according to the exemplary embodiment as the particle dispersion liquid of the display medium 12 containing the dispersion medium 50 and the particle group 34, that is, the form of dispersing the electrophoretic particles according to the exemplary embodiment as the particle group 34 in the dispersion medium 50.

As shown in FIG. 1, the display device 10 according to the exemplary embodiment is composed of the display medium 12, the voltage applying unit 16 that applies a voltage to the display medium 12, and the controlling unit 18.

The display medium 12 is composed of the display substrate 20 which is an image display face, the rear substrate 22 facing the display substrate 20 with a space, the spacing member 24 for maintaining the space between these substrates of a specific interval and also dividing the space between the display substrate 20 and the rear substrate 22 to a plurality of cells, and the reflecting particle group 36 having optical reflection characteristic different from that of the particle group 34 enclosed in each cell.

The above cell means a region surrounded with the display substrate 20, the rear the substrate 22 and the spacing member 24. The dispersion medium 50 is enclosed in the cell. The particle group 34 is composed of a plurality of particles and dispersed in the dispersion medium 50 and the plurality of particles move between the display substrate 20 and the rear substrate 22 through space between the reflecting particle group 36 according to the electric field intensity formed in the cell.

The display medium 12 may be constituted so as to perform display of every pixel by forming the spacing member 24 to correspond to each pixel at the time of displaying an image on the display medium 12 and forming a cell to correspond to each pixel.

In the exemplary embodiment, for simplifying explanation, the exemplary embodiment is described by attracting attention to one cell. Each constituent is described in detail below.

First, a pair of electrodes will be explained.

The display substrate 20 has a constitution where the surface electrode 40 and the surface layer 42 are laminated on the supporting substrate 38 in this order. The rear substrate 22 has a constitution where, on the supporting substrate 44, the rear electrode 46 and the surface layer 48 are laminated.

The display substrate 20, or both the display substrate 20 and the rear substrate 22 have light transmitting property. The light transmitting property in the exemplary embodiment means the transmittance of visible light of 60% or more.

As the materials of the supporting substrate 38 and the supporting substrate 44, glass, and plastics, such as a polyethylene terephthalate resin, a polycarbonate resin, an acrylic resin, a polyimide resin, a polyester resin, an epoxy resin, and a polyether sulfone resin are exemplified.

As the materials of the surface electrode 40 and the rear electrode 46, oxides of indium, tin, cadmium, and antimonyl, complex oxides, such as ITO, metals, such as gold, silver, copper, and nickel, and organic materials, such as polypyrrole and polythiophene are exemplified. The surface electrode 40 and the rear electrode 46 may be any of single films, mixed films and complex films of these materials. The thickness of the surface electrode 40 and the rear electrode 46 is preferably 100 Å or more and 2,000 Å or less. The rear electrode 46 and the surface electrode 40 may be formed in the state of matrix or stripe.

The surface electrode 40 may be buried in the supporting substrate 38. Further, the rear electrode 46 may be buried in the supporting substrate 44. In such a case, the materials of the supporting substrate 38 and the supporting substrate 44 are selected according to the composition of each particle of the particle group 34.

Each of the rear electrode 46 and the surface electrode 40 may be separated from the display substrate 20 and the rear substrate 22 and arranged on the outside of the display medium 12.

In the above explanation, both of the display substrate 20 and the rear substrate 22 are provided with an electrode (surface electrode 40 and rear electrode 46), but an electrode may be provided on one side, and active matrix driving may be performed.

For performing active matrix driving, the supporting substrate 38 and the supporting substrate 44 may be provided with TFT (thin film transistor) on every pixel. It is preferred to provide TFT on the rear substrate 22 not on the display substrate 20.

The surface layer is described below.

The surface layer 42 and the surface layer 48 are formed on the surface electrode 40 and the rear electrode 46, respectively. As the materials for forming the surface layer 42 and the surface layer 48, for example, polycarbonate, polyester, polystyrene, polyimide, epoxy, polyisocyanate, polyamide, polyvinyl alcohol, polybutadiene, polymethyl methacrylate, copolymerized nylon, UV-curable acrylic resin and fluorine resin are exemplified.

The surface layer 42 and the surface layer 48 may be composed of the above resin and charge-transporting material, or may be formed of a self-supporting resin having charge-transporting property.

Next, the spacing member is described below.

The spacing member 24 for maintaining the space between the display substrate 20 and the rear substrate 22 is formed of, for example, a thermoplastic resin, a thermosetting resin, an electron bean-curable resin, a photo-curable resin, rubber or metal.

The spacing member 24 may be integrated into either the display substrate 20 or the rear substrate 22. In such a case, integration is performed by etching treatment for etching the supporting substrate 38 or the supporting substrate 44, laser treatment, press treatment using a die prepared in advance, or printing treatment.

In this case, the spacing member 24 is manufactured on either or both of the display substrate 20 and the rear substrate 22.

The spacing member 24 may be colored or colorless, but is preferably colorless and transparent. In such a case a transparent resin such as polystyrene, polyester or acryl is used.

It is preferred that the spacing member 24 in a particulate state is also transparent, and in addition to transparent resin, e.g., polystyrene, polyester or acrylic resin, glass particles are also used.

"Transparent" means to have the transmittance of visible light of 60% or more.

The reflecting particle group is described below.

The reflecting particle group 36 is composed of reflecting particles having optical reflection characteristic different from that of the particle group 34, and functions as a reflecting member of displaying different color from that of the particle group 34. The reflecting particle group 36 also has a function as a spacing member of moving particles between the display substrate 20 and the rear substrate 22 with no inhibition. That is, particles of the particle group 34 are moved from the side of the rear substrate 22 to the side of the display substrate 20, or from the side of the display substrate 20 to the side of the rear substrate 22 through the reflecting particle group 36. The color of the reflecting particle group 36 is preferably white or black as a background color, but may be other colors. The reflecting particle group 36 may be a non-charged particle group (particle group not moving according to electric field), or may be a charged particle group (particle group moving according to electric field). In the exemplary embodiment, the reflecting particle group 36 in the case of non-charged particle group and white in color is described, but not limitative.

As the particles of the reflecting particle group 36, particles obtained by dispersing a white pigment (e.g., titanium oxide, silicon oxide, zinc oxide) in a resin (e.g., polystyrene resin, polyethylene resin, polypropylene resin, polycarbonate resin, polymethyl methacrylate resin (PMMA), acrylic resin, phenol resin, formaldehyde condensate), or resin particles (e.g., polystyrene particles, polyvinyl naphthalene particles, bis-melamine particles) are exemplified. When particles other than white particles are applied to the particles of the reflecting particle group 36, the above resins including a pigment or dye of a desired color may be used. Pigments or dyes of RGB and YMC generally used in printing inks or color toners are exemplified.

For enclosing the reflecting particle group 36 between substrates, for example, in inkjet method is used. In the case of fixing the reflecting particle group 36, the reflecting particle group 36 is enclosed and then heated (if necessary, by pressing) to melt the surface layers of the particles of the reflecting particle group 36, while maintaining the spaces of the particles.

Other constitutions of the display medium are described below.

The size of the cell in the display medium 12 is closely related to the resolution of the display medium 12. The smaller the size of cell, the higher is the resolution of the image displayed on the display medium 12. Generally the length of the cell in the face direction of the display substrate 20 of the display medium 12 is 10 μm or more and 1 mm or less.

The content of the particle group 34 (% by mass) based on the gross mass in the cell is not especially restricted so long as a desired hue can be obtained. As the display medium 12, it is effective to adjust the content by the thickness of the cell (the distance between the display substrate 20 and the rear substrate 22). That is, for obtaining a desired hue, the thicker the cell, the smaller is the content, and the thinner the cell, the larger can be the content. Generally, the content is 0.01% by mass or more and 50% by mass or less.

For fixing the display substrate 20 and the rear substrate 22 to each other through the spacing member 24, fixing units such as a combination of bolt and nut, clamp, clip, a frame for fixing are used. Fixing units such as an adhesive, heat melting and ultrasonic binding may also be used.

The display medium 12 thus constituted is used, for example, for a bulletin board on which images are preserved and rewritten, a circular bulletin, an electronic blackboard, an advertisement, a signboard, a flasher indicator, electronic paper, electronic newspaper, electronic publication and document sheets common to copier and printer.

As described above, the display device 10 according to the exemplary embodiment is composed of the display medium 12, the voltage applying unit 16 that applies a voltage to the display medium 12, and the controlling unit 18 (refer to FIG. 1).

The surface electrode 40 and the rear electrode 46 are electrically connected to the voltage applying unit 16. In the exemplary embodiment, the case where both the surface electrode 40 and the rear electrode 46 are electrically connected to the voltage applying unit 16 is described, but one of the surface electrode 40 and the rear electrode 46 may be connected to the earth and the other may be connected to the rear electrode 46.

The voltage applying unit 16 is connected to the controlling unit 18 in a manner such that signals are delivered and received.

The controlling unit 18 is constituted as a micro-computer containing CPU (Central Processing Unit) for governing the actuation of the device as a whole, RAM (Random Access Memory) for memorizing various data temporarily, and ROM (Read Only Memory) where various programs such as a control program for controlling the device at large are memorized in advance.

The voltage applying unit 16 is a voltage applying device for applying a voltage to the surface electrode 40 and the rear electrode 46, which applies the voltage to the surface electrode 40 and the rear electrode 46 according to the control of the controlling unit 18.

The function of the display device 10 is described below. The function is explained according to the actuation of the controlling unit 18.

The case where the particle group 34 enclosed in the display medium 12 is charged to positive electrode is described. Further, the case where the dispersion medium 50 is transparent and the reflecting particle group 36 is colored in white is explained. That is, in the exemplary embodiment, the case where the display medium 12 displays the color shown by the movement of the particle group 34, and the reflecting particle group 36 shows white as the background color is explained.

For convenience's sake, the actuation from the time when the particle group 34 attached to the side of the rear substrate 22 is described.

In the first place, actuation signal to show to apply a voltage so that the surface electrode 40 becomes negative electrode and the rear electrode 46 becomes positive electrode is output to the voltage applying unit 16 for prescribed time. From the state shown in FIG. 2A, when the voltage applied to between the electrodes is increased and the voltage over the threshold voltage by which the surface electrode 40 is negative electrode and concentration variation is finished is applied, the particles constituting the particle group 34 charged to positive electrode move to the side of the display substrate 20 and arrives on the display substrate 20 in the state of aggregation force being reduced (refer to FIG. 2B).

When application of voltage to between electrodes is finished, the particle group 34 is restrained on the side of the display substrate 20, and the color exhibited by the particle group 34 is visually confirmed as the color of the display medium 12 which is viewed from the display substrate 20 with white of the color of the reflecting particle group 36 as the background.

In the next place, actuation signal to show to apply a voltage so that the surface electrode 40 becomes positive electrode and the rear electrode 46 becomes negative electrode is output to the voltage applying unit 16 for prescribed time. When the voltage applied to between the electrodes is increased and the voltage over the threshold voltage by which the surface electrode 40 is positive electrode and concentration variation is finished is applied, the particles constituting the particle group 34 charged to positive electrode move to the side of the display substrate 20 and arrive on the display substrate 20 in the state of aggregation force being reduced (refer to FIG. 2A).

When application of voltage to between electrodes is finished, the particle group 34 is restrained on the side of rear substrate 22. On the other hand, white as the color of the reflecting particle group 36 is visually confirmed as the color of display medium 12 which is viewed from the display substrate 20. The particle group 34 is hidden by the reflecting particle group 36 and becomes difficult to be visually confirmed.

The voltage application time is memorized in advance in memory such as ROM as the data for showing voltage application time in voltage application in actuation, drawing of the inside of the controlling unit 18 is omitted. The data showing voltage application time is read at the time of run.

Thus, in the display device 10 according to the exemplary embodiment, display is carried out when the particle group 34 arrives on and is attached to the display substrate 20 or the rear substrate 22, and aggregates.

In the display medium 12 and the display device 10 according to the exemplary embodiment, the form of providing the surface electrode 40 on the display substrate 20 and the rear electrode 46 on the rear substrate 22 to apply voltage to between the electrodes (i.e., between the substrates) and moving the particle group 34 between the substrates to perform display is described, but not restricted thereto. For example, a form of providing the surface electrode 40 on the display substrate 20, while providing an electrode on the spacing member, applying voltage to between the electrodes, moving the particle group 34 between the display substrate 20 and the spacing member to thereby effect display is also possible.

In the display medium 12 and the display device 10 according to the exemplary embodiment, the case of using one kind (one color) of the particle group as the particle group 34 is described, but not limitative, and two or more kinds (two or more colors) of particle groups may be applied.

Specifically, for example, the form of using positively chargeable first particle group and negatively chargeable second particle group as the particle group 34, and positively chargeable third particle group having threshold voltage different from that of the particles of the first particle group, and having a larger particle size is exemplified.

EXAMPLE

The invention will be described in further detail with reference to examples, but the invention is by no means restricted thereto. In the examples "parts" and "%" mean "parts by mass" and "% by mass" unless otherwise indicated.

Example 1

An aqueous dispersion liquid is prepared by adding 45 parts by mass of styrene/acrylic resin, X-1202L (manufactured by Seiko PMC Corporation) as the resin for the core particle, 5 parts by mass of a melamine compound represented by (B)-2, NIKALAC MW-390 (manufactured by Sanwa Chemical Co., Ltd.) as the nitrogen-containing heterocyclic compound, and 50 parts by mass of a cyan pigment, H525F (manufactured by Sanyo Color Works Ltd.) as a coloring agent to water, to make the entire to 15% by mass.

In the next place, an emulsion liquid is prepared by mixing the obtained aqueous dispersion liquid as a dispersion phase and a silicone oil solution (obtained by adding 1% by mass of a surfactant, KF-6028 (manufactured by Shin-Etsu Chemical Co., Ltd.) to silicone oil, KF-96-2CS (manufactured by Shin-Etsu Chemical Co., Ltd.)) as a continuous phase in mass ratio of 10/1 (continuous phase/dispersion phase), and emulsifying the mixture with a homogenizer.

Subsequently, the obtained emulsion liquid is dried in an evaporator at 60° C. for 6 hours to remove the water in the emulsion liquid, and a core particle dispersion liquid is obtained. The obtained core particle has an average particle size of 0.6 μm, and C.V. value of 25% (index showing mono-dispersibility: Coefficient of Variation: CV (%)=(σ/D)×100 (σ: standard deviation, D: average particle size)).

A core particle dispersion liquid of 1% by mass is prepared by washing the core particles dispersed in the dispersion liquid with silicone oil by using a centrifugal separator.

A copolymer is prepared as the resin for a covering layer, which contains SILAPLANE FM-0721 (manufactured by Chisso Corporation) as the polymerization component having a silicone chain, 2-(acryloyloxy)ethyltrimethylammonium chloride (AOETMA) and 2-hydroxyethyl methacrylate (HEMA) as the polymerization components having a chargeable group, an isocyanate monomer (an isocyanate monomer having a blocked isocyanate group, KARENZ MOI-BP (manufactured by Showa Denko K.K.) as the polymerization component having a reactive group (crosslinking group), and MMA (methyl methacrylate) as other polymerization component (the molar ratio is shown in Table 2 below).

In the next place, 2 g of the obtained resin for covering layers is added to IPA (isopropyl alcohol) and 10% by mass IPA solution is prepared.

Subsequently, 20 g of the obtained 10% by mass IPA solution is added to 20 g of the core particle dispersion liquid and stirred, followed by drying in an evaporator at 60° C. for 1 hour to remove IPA in the core particle dispersion liquid, and the resin for the covering layer is precipitated on the core particles, thus the particulate product wherein the covering layer is formed on the surface of the core particle is obtained.

Then, the core particle dispersion liquid is heated at 130° C. for 1 hour, and the resins constituting the core particles and the covering layers are crosslinked.

A dispersion liquid of the electrophoretic particle, wherein the covering layer is formed on the surface of the core particle, is obtained through the above processes.

The electrophoretic particles dispersed in the core particle dispersion liquid are washed with silicone oil by using a centrifugal separator.

Examples 2 to 9

An electrophoretic particle and an electrophoretic particle dispersion liquid are obtained in the same manner as in Example 1 except for changing the compositions of the core particle and the covering layer according to Tables 1 and 2 shown below.

However, in Examples 5 and 6, heat treatment for crosslinking the resins constituting the core particles and the covering layers is not performed.

In Examples 7, 8 and 9, stearyl methacrylate (SMA) is used as the polymerization component having an alkyl chain in place of the component having a silicone chain, as the polymerization component of the resin for the covering layer.

Comparative Example 1

An electrophoretic particle and an electrophoretic particle dispersion liquid are obtained in the same manner as in Example 1 except for not compounding a nitrogen-containing heterocyclic compound in the manufacture of the core particle.

Comparative Example 2

After a core particle is manufactured in the same manner as in Example 1, the dispersion liquid of this particle is heated at 130° C. for 1 hour and the resin constituting the core particle is crosslinked to obtain the electrophoretic particle, and the dispersion liquid of the particle is obtained.

Comparative Example 3

An electrophoretic particle and a dispersion liquid thereof are obtained in the same manner as in Example 1, except that the nitrogen-containing heterocyclic compound is not compounded.

However, as the polymerization component of the resin for the covering layer, stearyl methacrylate (SMA) is used as a polymerization component having an alkyl chain in place of the polymerization component having a silicone chain. The parts by mass of the resin constituting the core particle are changed to 50 parts by mass.

[Evaluation]

The dispersion liquid is adjusted such that a white particle is contained in KF-96-2CS of the continuous phase in an amount of 20% by mass, and the electrophoretic particle (cyan particle) in an amount of 1% by mass to thereby obtain an electrophoretic particle dispersion liquid.

The white particle is manufactured as follows.

—Manufacture of a White Particle—

Into a flask, 45 parts by mass of SILAPLANE FM-0721, 45 parts by mass of 2-vinylnaphthalene, 240 parts by mass of KF-96-1CS (manufactured by Shin-Etsu Chemical Co., Ltd.), and 2 parts by mass of lauroyl peroxide are added, and deoxidation is performed by bubbling of nitrogen at a flow rate of 0.2 liters/min while stirring, followed by heating in an oil bath at 70° C. for 10 hours to obtain a white particle dispersion liquid. The obtained particle dispersion liquid is precipitated by centrifugation, the supernatant is taken out and 400 ml of KF-96-2CS is added, and the liquid is returned to a dispersion state by ultrasonic irradiation. Washing and replacement with KF-96-2CS are performed by repeating this operation three times, and a white particle dispersion liquid is obtained.

The obtained white particle has an average particle size of 0.5 μm and a C.V. value of 10%.

Moreover, this white powder does not migrate by applying an electric field of ±20V.

In the next place, a sample of device is manufactured by enclosing the obtained electrophoretic particle dispersion liquid between a pair of glass substrates (in a cell where a spacer (a spacing member) of 50 μm intervenes between a pair of glass substrates) where indium tin oxide (ITO) electrodes are formed. The spacer is formed by spin coating CYTOP (CTL809M, manufactured by Asahi Glass Co., Ltd.) on the face where the electrode is formed of one side of the glass substrates, and heating at 200° C. for 4 hours.

By using the obtained device sample, voltage of ±15 V is applied to between the electrodes by a function generator (the electric power manufactured by NF Corporation is driven by LabVIEW manufactured by National Instruments), and the quantity of charge of the electrophoretic particle, threshold voltage, and ratio of the presence of the particle having a reversed polarity of the electrophoretic particle are measured with an ammeter (manufactured by Keithley) and an optical measuring unit (USB2000, manufactured by Ocean Optics, Inc.), specifically, as described below.

—Quantity of Charge—

The quantity of charge of the electrophoretic particle(s) (the quantity of charge at the beginning) is obtained by the application of rectangular wave of 0 V to 15 V and addition of the quantities of charge until the time when current value becomes constant.

After putting the electrophoretic particle dispersion in a screw vial and preserved at 60° C. for 1 week, the quantity of charge of the electrophoretic particle is measured again in a similar manner (the quantity of charge after the lapse of time).

—Threshold Voltage—

The threshold voltage of the electrophoretic particle(s) (the threshold voltage at the beginning) is obtained by the application of triangular wave of 0 V to 15 V at 0.05 Hz, and finding the voltage at the time of 90% of the maximum value of the reflectance by the optical measuring unit, and this is taken as the threshold voltage.

After putting the electrophoretic particle dispersion in a screw vial and preserved at 60° C. for 1 week, the threshold voltage of the electrophoretic particle is measured again in a similar manner (the threshold voltage after the lapse of time).

—Ratio of the Presence of a Particles Having Reversed Polarity—

The ratio of the presence of a particle having reversed polarity in the electrophoretic particles (the ratio of the presence at the beginning) is measured with an optical measuring unit by performing calibration of white, and black in the dark, with a standard sample.

After putting the electrophoretic particle dispersion in a screw vial and preserved at 60° C. for 1 week, the ratio of the presence of the particle having reversed polarity in the electrophoretic particles is measured again in a similar manner (the ratio of the presence of the particle having reversed polarity after the lapse of time).

TABLE 1

| | Composition of Core Particle | | | | | | |
|---|---|---|---|---|---|---|---|
| | Composition of Core Particle | | | | | | |
| Example No. | Resin for Core Particle | | Nitrogen-Containing Heterocyclic Compound | | Coloring Agent | | Presence of Crosslinking in Core Particle |
| | Kind | Parts by Mass | Kind | Parts by Mass | Kind | Parts by Mass | |
| Example 1 | X-1202L | 45 | MW-390 | 5 | H525F | 50 | Presence |
| Example 2 | X-1202L | 43 | MW-390 | 7 | H525F | 50 | Presence |
| Example 3 | X-1202L | 40 | MW-390 | 10 | H525F | 50 | Presence |
| Example 4 | X-1202L | 49 | MW-390 | 1 | H525F | 50 | Presence |

TABLE 1-continued

| | Composition of Core Particle | | | | | | |
|---|---|---|---|---|---|---|---|
| Example No. | Resin for Core Particle Kind | Parts by Mass | Nitrogen-Containing Heterocyclic Compound Kind | Parts by Mass | Coloring Agent Kind | Parts by Mass | Presence of Crosslinking in Core Particle |
| Example 5 | X-1202L | 25 | MW-390 | 25 | H525F | 50 | Absence |
| Example 6 | X-1202L | 45 | MW-390 | 5 | H525F | 50 | Absence |
| Example 7 | X-1202L | 45 | MW-390 | 5 | H525F | 50 | Presence |
| Example 8 | X-1202L | 43 | MW-390 | 7 | H525F | 50 | Presence |
| Example 9 | X-1202L | 40 | MW-390 | 10 | H525F | 50 | Presence |
| Comparative Example 1 | X-1202L | 50 | — | — | H525F | 50 | Absence |
| Comparative Example 2 | X-1202L | 45 | MW-390 | 5 | H525F | 50 | Presence |
| Comparative Example 3 | X-1202L | 50 | — | — | H525F | 50 | Absence |

TABLE 2

| | Resin Composition of Covering Layer | | | | | | | | | |
|---|---|---|---|---|---|---|---|---|---|---|
| Example No. | Polymerization Component Having a Silicone Chain Or Polymerization Component Having an Alkyl Chain Kind | Molar Ratio | Polymerization Component Having a Chargeable Group Kind | Molar Ratio | Kind | Molar Ratio | Polymerization Component Having a Reactive Group Kind | Molar Ratio | Other Polymerization Component Kind | Molar Ratio | Presence of Crosslinking in Covering Layer |
| Example 1 | FM-0721 | 10 | AOETMA | 10 | HEMA | 40 | MOI-BP | 10 | MMA | 30 | Presence |
| Example 2 | FM-0721 | 10 | AOETMA | 10 | HEMA | 40 | MOI-BP | 10 | MMA | 30 | Presence |
| Example 3 | FM-0721 | 10 | AOETMA | 10 | HEMA | 40 | MOI-BP | 10 | MMA | 30 | Presence |
| Example 4 | FM-0721 | 10 | AOETMA | 10 | HEMA | 40 | MOI-BP | 10 | MMA | 30 | Presence |
| Example 5 | FM-0721 | 10 | AOETMA | 10 | HEMA | 40 | MOI-BP | 10 | MMA | 30 | Absence |
| Example 6 | FM-0721 | 10 | AOETMA | 10 | HEMA | 40 | MOI-BP | 10 | MMA | 30 | Absence |
| Example 7 | SMA | 10 | AOETMA | 10 | HEMA | 40 | MOI-BP | 10 | MMA | 30 | Presence |
| Example 8 | SMA | 10 | AOETMA | 10 | HEMA | 40 | MOI-BP | 10 | MMA | 30 | Presence |
| Example 9 | SMA | 10 | AOETMA | 10 | HEMA | 40 | MOI-BP | 10 | MMA | 30 | Presence |
| Comparative Example 1 | FM-0721 | 10 | AOETMA | 10 | HEMA | 40 | MOI-BP | 10 | MMA | 30 | Presence |
| Comparative Example 2 | Having no covering layer | | | | | | | | | | |
| Comparative Example 3 | SMA | 10 | AOETMA | 10 | HEMA | 40 | MOI-BP | 10 | MMA | 30 | Presence |

TABLE 3

| | Evaluation | | | | | |
|---|---|---|---|---|---|---|
| | Quantity of Charge (nC/cm$^2$) | | Threshold Voltage (V/μm) | | Ratio of Reversed Polarity Particle (number %) | |
| Example No. | At the Beginning | After the Lapse of Time | At the Beginning | After the Lapse of Time | At the Beginning | After the Lapse of Time |
| Example 1 | 9 | 9 | 1.2 | 1.2 | 5 | 4 |
| Example 2 | 14 | 15 | 1.5 | 1.6 | 1 | 1 |
| Example 3 | 20 | 21 | 2.1 | 2.2 | 0 | 0 |

TABLE 3-continued

| | Evaluation | | | | | |
|---|---|---|---|---|---|---|
| | Quantity of Charge (nC/cm$^2$) | | Threshold Voltage (V/μm) | | Ratio of Reversed Polarity Particle (number %) | |
| Example No. | At the Beginning | After the Lapse of Time | At the Beginning | After the Lapse of Time | At the Beginning | After the Lapse of Time |
| Example 4 | 6 | 4 | 0.7 | 0.5 | 15 | 19 |
| Example 5 | 35 | 37 | 4.2 | 4.4 | 0 | 0 |
| Example 6 | 10 | 6 | 1.1 | 0.7 | 6 | 9 |
| Example 7 | 8 | 8 | 1.2 | 1.2 | 6 | 6 |
| Example 8 | 12 | 13 | 1.4 | 1.5 | 2 | 1 |
| Example 9 | 16 | 17 | 1.5 | 1.6 | 0 | 0 |
| Comparative Example 1 | 5 | 3 | 0.5 | 0.2 | 28 | 32 |
| Comparative Example 2 | 10 | 9 | 2.8 | 3.0 | 52 | 56 |
| Comparative Example 3 | 5 | 3 | 0.5 | 0.2 | 30 | 34 |

From the above results, it can be seen that the quantities of charge and threshold voltages are higher in Examples as compared with those of Comparative Examples.

It is also seen that the ratio of the presence of reversed polarity particles is low in Examples as compared with Comparative Examples.

The abbreviations in Tables 1 and 2 are as follows.
—Resin for a Core Particle—
X-1202L: [X-1202L (manufactured by Seiko PMC Corporation), weight average molecular weight: 20,000]
—Nitrogen-Containing Heterocyclic Compound—
MW-390: Melamine compound represented by the formula of Exemplified Compound (B)-2 [NIKALAC MW-390 (manufactured by Sanwa Chemical Co., Ltd.)]
—Coloring Agent—
H525F: Cyan pigment [H525F (manufactured by Sanyo Color Works Ltd.)]
—Resin for a Covering Layer—
FM-0721: [SILAPLANE FM-0721 (manufactured by Chisso Corporation), weight average molecular weight Mw: 5,000, structural formula (I) wherein $R_1$ is a methyl group, $R_1'$ is a butyl group, n is 68, x is 3]
SMA: Stearyl methacrylate
MAA: Methacrylic acid
HEMA: 2-Hydroxyethyl methacrylate
MOI-BP: Isocyanate monomer having a blocked isocyanate group 2-[(3,5-dimethylpyrazolyl)carbonylamino]ethyl methacrylate [Karenz MOI-BP (manufactured by Showa Denko K.K.)]
MMA: Methyl methacrylate
AOETMA: 2-(Acryloyloxy)ethyltrimethylammonium chloride

What is claimed is:

1. An electrophoretic particle containing:
a core material particle formed of a composition containing a resin, a nitrogen-containing heterocyclic compound having an imino group, a methylol group, or an alkoxymethyl group in the molecule, and a coloring agent, wherein the nitrogen containing heterocyclic compound crosslinks the resin; and
a covering layer on a surface of the core material particle, wherein the covering layer is formed of a composition containing a resin of a copolymer comprising at least a polymerization component having a silicone chain.

2. The electrophoretic particle according to claim 1, wherein the nitrogen-containing heterocyclic compound is selected from the group consisting of a melamine compound and a guanamine compound each having any one of an imino group, a methylol group and an alkoxymethyl group in the molecule.

3. The electrophoretic particle according to claim 1, wherein the covering layer is formed of a composition containing a resin having a dispersion medium-philic part soluble in a dispersion medium, wherein the electrophoretic particle is dispersed and a dispersion medium-phobic part insoluble in a dispersion medium wherein the electrophoretic particle is dispersed.

4. The electrophoretic particle according to claim 1, wherein the content of the nitrogen-containing heterocyclic compound is about 0.5% by mass or more and about 50% by mass or less based on the total of the core material particle.

5. The electrophoretic particle according to claim 3, wherein the covering layer is a covering layer composed of a resinous crosslinked product of the composition containing the resin.

6. An electrophoretic particle dispersion liquid comprising: a dispersion medium and an electrophoretic particle dispersed in the dispersion medium, wherein the electrophoretic particle is the electrophoretic particle according to claim 1.

7. The electrophoretic particle dispersion liquid according to claim 6, wherein the dispersion medium contains a solvent having a low dielectric constant.

8. A display medium comprising: a pair of substrates at least either one of which has light-transmitting property, and the electrophoretic particle dispersion liquid according to claim 6, which is enclosed between the pair of substrates.

9. A display medium comprising: a pair of electrodes at least either one of which has light-transmitting property, and an area having the electrophoretic particle dispersion liquid according to claim 6, which is enclosed between the pair of electrodes.

10. A display device comprising: the display medium according to claim 8 and a voltage-applying unit that applies a voltage between the pair of substrates of the display medium.

11. A display device comprising: the display medium according to claim 9 and a voltage-applying unit that applies a voltage between the pair of electrodes of the display medium.

12. An electrophoretic particle comprising a core formed of a resinous crosslinked product including:
   a resin;
   a melamine compound having an imino group, a methylol group or an alkoxymethyl group wherein the melamine compound crosslinks the resin; and
   a coloring agent.

13. An electrophoretic particle comprising a core formed of a resinous cross linked product including:
   a resin;
   a guanamine compound having an imino group, a methylol group or an alkoxymethyl group wherein the guanamine compound crosslinks the resin; and
   a coloring agent.

14. The electrophoretic particle of claim 1, wherein the electrophoretic particle is heated to at least at 130° C. for at least one hour to cause the nitrogen containing heterocyclic compound to crosslink the resin.

15. The electrophoretic particle of claim 12, wherein the melamine compound is of Formula (B)

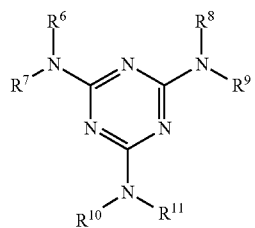

(B)

wherein each of $R_6$ to $R_{11}$ independently represents a hydrogen atom, —$CH_2$—OH, —$CH_2$—O—$R_{12}$, or —O—$R_{12}$; and $R_{12}$ represents an alkyl group having 1 to 5 carbon atoms which may be branched.

16. The electrophoretic particle of claim 12, wherein the electrophoretic particle is heated to at least at 130° C. for at least one hour to cause the melamine compound to crosslink the resin.

17. The electrophoretic particle of claim 13, wherein the guanamine compound is of Formula (A)

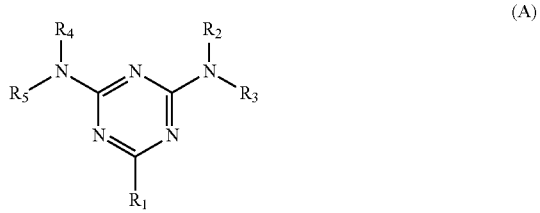

(A)

wherein $R_1$ represents a straight chain or branched alkyl group having 1 to 10 carbon atoms, a substituted or unsubstituted phenyl group having 6 to 10 carbon atoms, or a substituted or unsubstituted alicyclic hydrocarbon group having 4 to 10 carbon atoms; each of $R_2$ to $R_5$ independently represents a hydrogen atom, —$CH_2$—OH or —$CH_2$—O—$R_6$; and $R_6$ represents a straight chain or branched alkyl group having 1 to 10 carbon atoms.

18. The electrophoretic particle of claim 13, wherein the electrophoretic particle is heated at least at 130° C. for at least one hour to cause the guanamine compound to crosslink the resin.

* * * * *